US011912032B2

(12) United States Patent
Toya et al.

(10) Patent No.: US 11,912,032 B2
(45) Date of Patent: Feb. 27, 2024

(54) LIQUID EJECTING APPARATUS

(71) Applicant: SEIKO EPSON CORPORATION, Tokyo (JP)

(72) Inventors: Akihiro Toya, Shiojiri (JP); Kazuhiro Kobayashi, Shiojiri (JP); Yuki Araki, Matsumoto (JP); Shogo Nakada, Matsumoto (JP); Taiki Kono, Ina (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 17/651,155

(22) Filed: Feb. 15, 2022

(65) Prior Publication Data

US 2022/0258470 A1 Aug. 18, 2022

(30) Foreign Application Priority Data

Feb. 16, 2021 (JP) ................................ 2021-022328
Feb. 26, 2021 (JP) ................................ 2021-031074

(51) Int. Cl.

*B41J 2/14* (2006.01)
*B41J 2/19* (2006.01)
*B41J 2/175* (2006.01)

(52) U.S. Cl.

CPC ....... *B41J 2/14233* (2013.01); *B41J 2/17563* (2013.01); *B41J 2/19* (2013.01)

(58) Field of Classification Search

CPC ...... B41J 2/14233; B41J 2/17563; B41J 2/19; B41J 2/175; B41J 29/13; B41J 29/02; B41J 2/01

See application file for complete search history.

(56) References Cited

FOREIGN PATENT DOCUMENTS

| | | | |
|---|---|---|---|
| EP | 1792732 | A | 6/2007 |
| JP | 2002-019225 | A | 1/2002 |
| JP | 2007-144826 | A | 6/2007 |
| JP | 2012-183766 | A | 9/2012 |
| JP | 2016-175279 | A | 10/2016 |

OTHER PUBLICATIONS

Kiyomizu, Yoshiaki et al., Machine Translation of “Ink Supply Device And Ink Jet Recording Device” CN 202098105 U, Jan. 4, 2012, Paragraphs 0039-0057, see Figs. 1-8 (Year: 2012).*

* cited by examiner

*Primary Examiner* — Lisa Solomon
(74) *Attorney, Agent, or Firm* — WORKMAN NYDEGGER

(57) ABSTRACT

A liquid ejecting apparatus includes: a liquid ejecting head configured to eject a liquid; a liquid flowing portion coupled to the liquid ejecting head and configured to flow the liquid; and a frame that houses the liquid ejecting head and the liquid flowing portion. The frame is provided with a passage hole configured to pass the liquid flowing portion along a depth direction. when viewed in the depth direction, a portion of the liquid flowing portion disposed outside the passage hole is configured to be deformed.

12 Claims, 13 Drawing Sheets

LIQUID EJECTING APPARATUS

The present application is based on, and claims priority from JP Application Serial Number 2021-022328, filed Feb. 16, 2021 and JP Application Serial Number 2021-031074, filed Feb. 26, 2021, the disclosures of which are hereby incorporated by reference herein in their entirety.

BACKGROUND

1. Technical Field

The present disclosure relates to a liquid ejecting apparatus.

2. Related Art

There is a liquid injection apparatus which represents an example of a liquid ejecting apparatus that ejects a liquid from a line head representing an example of a liquid ejecting head to a medium for printing, as described in JP-A-2016-175279 for example. The liquid injection apparatus includes a discharge tray to which a printed medium is discharged, and a liquid flowing portion for supplying a liquid to the line head. A deformable tube is provided to a portion of the liquid flowing portion. The tube couples a liquid container containing the liquid to the line head, thus supplying the liquid to the line head.

The discharge tray is openably and closably provided. The line head can be accessed from outside by opening the discharge tray, and the line head can thus be detached.

According to JP-A-2016-175279, the line head is detachable by decoupling the tube from the line head. However, it is not possible to detach the entire liquid flowing portion inclusive of the decoupled tube. In other words, JP-A-2016-175279 does not consider detachment of the entire liquid flowing portion from the liquid ejecting apparatus.

SUMMARY

A liquid ejecting apparatus to solve the above-described problem includes: a liquid ejecting head configured to eject a liquid; a liquid flowing portion coupled to the liquid ejecting head and configured to flow the liquid; and a frame that houses the liquid ejecting head and the liquid flowing portion. The frame is provided with a passage hole configured to pass the liquid flowing portion along a depth direction. When viewed in the depth direction, a portion of the liquid flowing portion disposed outside the passage hole is configured to be deformed.

DESCRIPTION OF EXEMPLARY EMBODIMENTS

First Embodiment

Figure 1:
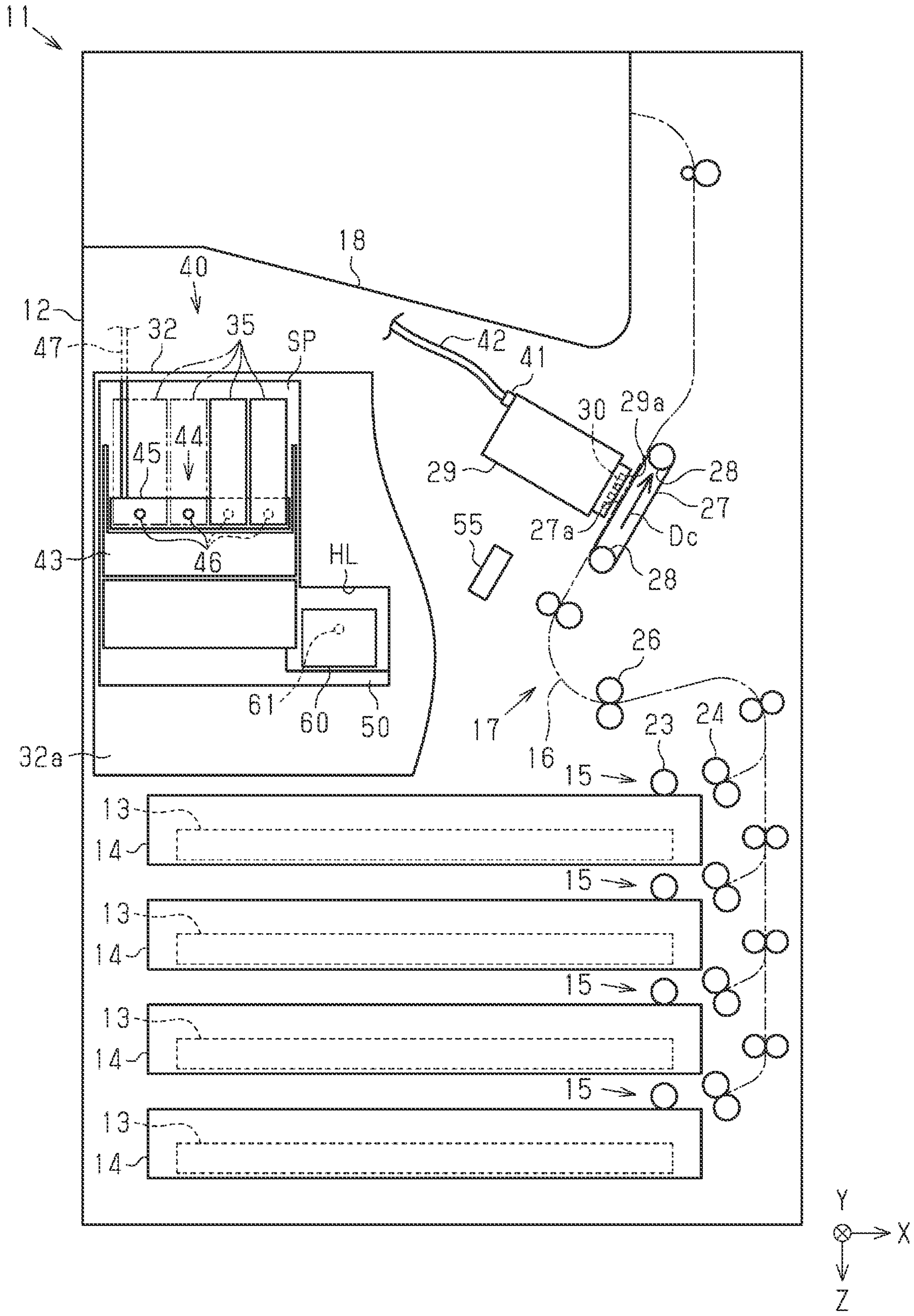
FIG. 1 is a schematic diagram illustrating a liquid ejecting apparatus according to a first embodiment.

A liquid ejecting apparatus according to a first embodiment will be described below with reference to the drawings. The liquid ejecting apparatus is, for example, an ink jet printer that performs printing by ejecting an ink representing an example of a liquid onto a medium such as a paper sheet.

Concerning Configuration of Liquid Ejecting Apparatus 11

In the drawings, a direction of gravitational force is indicated with a z axis on the assumption that a liquid ejecting apparatus 11 is placed on a horizontal plane, and directions along the horizontal plane are indicated with an x axis and a y axis. The x axis, the y axis, and the z axis are orthogonal to one another. In the following description, a direction parallel to the x axis will also be referred to as a width direction x, a direction parallel to the y axis will also be referred to as a depth direction y, and a direction parallel to the z axis will also be referred to as a vertical direction z.

As illustrated in FIG. 1, the liquid ejecting apparatus 11 may include a housing 12, a medium container 14 capable of containing a medium 13, and a feeding portion 15 that feeds the medium 13. The liquid ejecting apparatus 11 may include a transporting portion 17 that transports the medium 13 along a transportation route 16 indicated with a chain line in FIG. 1, and a stacker 18 that receives the medium 13. The transportation route 16 is a route that links the medium container 14 to the stacker 18.

The medium container 14 can contain the media 13 in a stacked state. The liquid ejecting apparatus 11 may include a plurality of medium containers 14 and the feeding portions 15 as many as the medium containers 14. Each feeding portion 15 may include a feed roller 23 that feeds the media 13 contained in the medium container 14, and a separating portion 24 that separates the media 13 one by one. The feeding portion 15 sends the media 13 contained in the medium container 14 out to the transportation route 16.

The transporting portion 17 may include a transportation roller 26, an endless transportation belt 27, and a pair of pulleys 28. Here, the transportation belt 27 is wound around the pulleys 28. The transporting portion 17 may include a plurality of transportation rollers 26. The transportation rollers 26 are rotated in a state of pinching the medium 13, thereby transporting the medium 13.

The transportation belt 27 includes a transportation surface 27*a* to transport the medium 13. The transportation surface 27*a* is a flat surface out of an outer peripheral surface of the transportation belt 27, which is designed to support the medium 13 by electrostatic adsorption, for example. The transportation surface 27*a* of the transportation belt 27 may be inclined with respect to the horizontal plane. In this embodiment, a direction extending along the transportation surface 27*a* for transporting the medium 13 will be referred to as a transporting direction Dc. The transportation belt 27 goes around while supporting the medium 13 onto the transportation surface 27*a*, thus transporting the medium 13 in the transporting direction Dc.

The liquid ejecting apparatus 11 includes a liquid ejecting head 29 that ejects a liquid. The liquid ejecting head 29 of this embodiment includes a nozzle surface 29*a* on which nozzles 30 for ejecting the liquid are open. The nozzle surface 29*a* is formed from a nozzle plate on which the nozzles 30 are open. The liquid ejecting head 29 ejects the liquid from the nozzles 30 and performs printing on the medium 13 supported by the transportation belt 27. The liquid ejecting head 29 of this embodiment is of a line type which can eject the liquid across a width direction of the medium 13. The liquid ejecting head 29 is fitted such that a long direction of the liquid ejecting head 29 coincides with the depth direction y.

The liquid ejecting apparatus 11 includes a liquid flowing portion 40 that can flow the liquid, and a frame 32 that houses the liquid ejecting head 29 and the liquid flowing portion 40. The frame 32 includes a first surface 32*a*, which is provided with a passage hole HL configured to pass the liquid flowing portion 40. The first surface 32*a* is the surface which is located in front of the liquid ejecting head 29 in the depth direction y and extends along the x axis and the z axis. The passage hole HL penetrates the frame 32 in the depth direction y.

The liquid flowing portion 40 is coupled to the liquid ejecting head 29. The liquid flowing portion 40 of this embodiment includes a coupling portion 41 to be detachably coupled to the liquid ejecting head 29. The liquid flowing portion 40 may include an attachment portion 43 to which liquid containers 35 each containing the liquid are detachably attached, needle portions 46 provided to the attachment portion 43, a base 45 that supports the needle portions 46, and a supply flow channel 47 that couples the needle portions 46 to the coupling portion 41. The liquid containers 35 attached to the attachment portion 43 can supply the liquid by running into the needle portions 46.

A plurality of liquid containers 35 may be made attachable to the attachment portion 43. When the liquid containers 35 are attachable to the attachment portion 43, the liquid flowing portion 40 includes the needle portions 46 and the supply flow channels 47 in the same number as the attachable liquid containers 35. The coupling portion 41 may be configured such that the single coupling portion 41 couples the supply flow channels 47 integrally to the liquid ejecting head 29. The liquid flowing portion 40 may include the coupling portions 41 in the same number as the supply flow channels 47. Even when the liquid ejecting apparatus 11 includes a plurality of needle portions 46, supply flow channels 47, and coupling portions 41, the needle portions 46, the supply flow channels 47, and the coupling portions 41 have the same configurations, respectively. For this reason, a description will be given below with reference to FIG. 1 that illustrates one supply flow channel 47 and one coupling portion 41, and overlapping explanations will be omitted.

At least part of the supply flow channel 47 may be deformable. Specifically, the liquid flowing portion 40 may include a deformation flow channel 42 that is deformable. The deformation flow channel 42 may be, for example, formed from a flexible tube, or may be constructed to be deformable by using a bellows and the like.

In the liquid flowing portion 40, the attachment portion 43 and part of the supply flow channel 47 are located behind the passage hole HL in the depth direction y. Accordingly, when a worker sees the passage hole HL from a position in front of the frame 32, the worker can see part of the liquid flowing portion 40 through the passage hole HL.

The liquid ejecting apparatus 11 may include a tray 50. The tray 50 is provided immediately below the liquid flowing portion 40. The attachment portion 43 may be provided on the tray 50 in such a way as to fit inside of the tray 50 in a horizontal direction. The horizontal direction is a direction extending along the horizontal plane. Each of the width direction x and the depth direction y represents an example of the horizontal direction. Dimensions in the width direction x and the depth direction y of the attachment portion 43 are smaller than corresponding dimensions of the tray 50.

Figure 2:
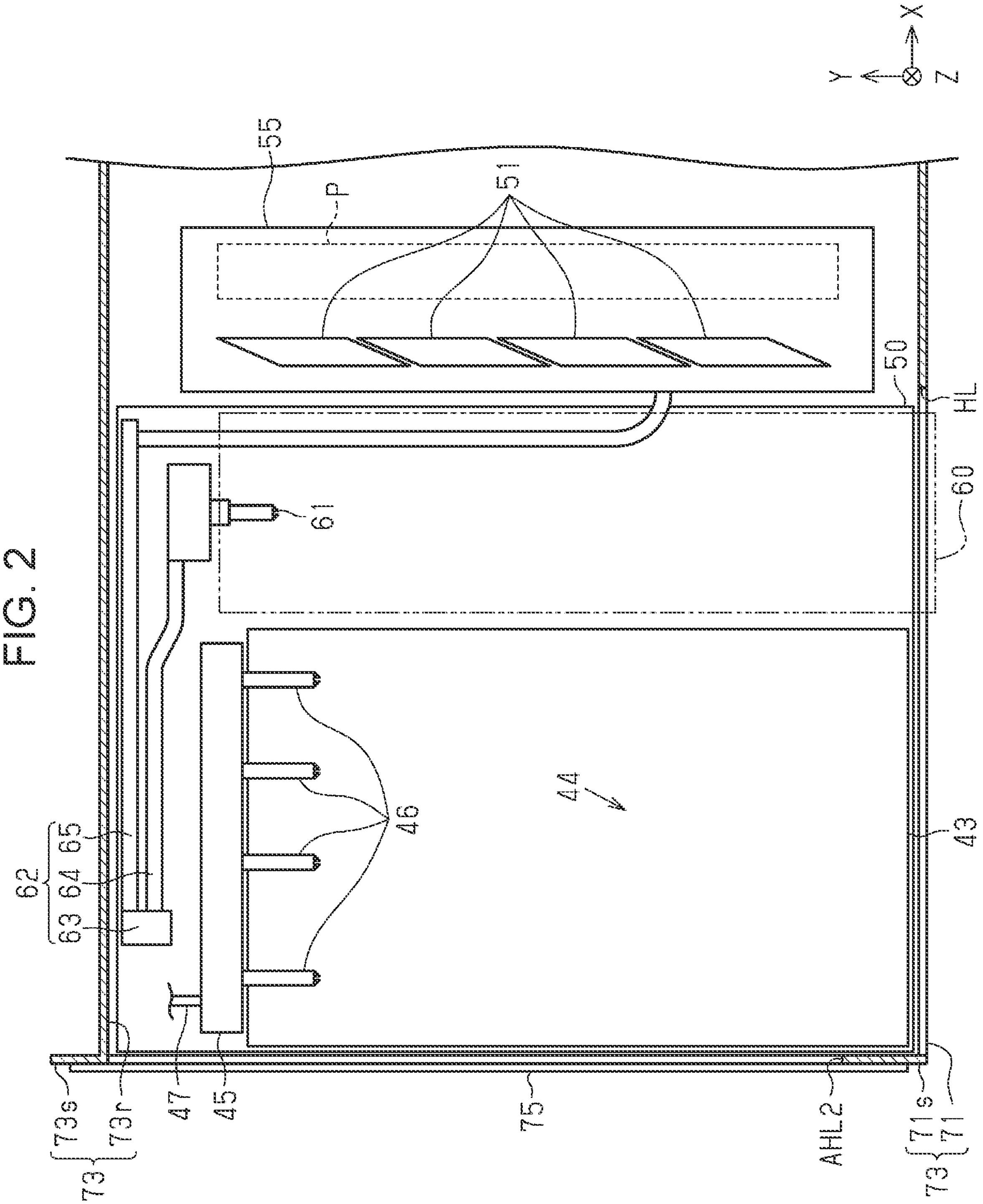
FIG. 2 is a schematic diagram illustrating a maintenance portion and a waste liquid flow channel.

As illustrated in FIG. 2, the attachment portion 43 may include a holding portion 44 that can hold the deformation flow channel 42. The holding portion 44 of this embodiment can hold the deformation flow channel 42 when the liquid containers 35 are detached from the attachment portion 43. The holding portion 44 of this embodiment is an upper surface of the attachment portion 43.

The liquid ejecting apparatus 11 may include a maintenance portion 55 that conducts maintenance of the liquid ejecting head 29, a waste liquid draining portion 61 that drains the liquid discharged from the liquid ejecting head 29 in the course of the maintenance as a waste liquid, and a waste liquid flow channel 62 that links the maintenance portion 55 to the waste liquid draining portion 61. The waste liquid flow channel 62 may include a dividing portion 63 that can divide the waste liquid flow channel 62, a downstream flow channel 64 that links the dividing portion 63 to the waste liquid draining portion 61, and an upstream flow channel 65 that links the maintenance portion 55 to the dividing portion 63. A waste liquid container 60 is detachably coupled to the waste liquid draining portion 61. The waste liquid container 60 contains the waste liquid drained from the waste liquid draining portion 61. The waste liquid draining portion 61 and the dividing portion 63 may be provided on the tray 50 in such a way as to fit inside of the tray 50 in the horizontal direction.

The maintenance portion 55 may include one or more caps 51 and a suction pump P that can suction the inside of the caps 51. Each cap 51 can move to a stand-by position illustrated in FIG. 1, which is located away from the liquid ejecting head 29, and to a not-illustrated capping position. The cap 51 located at the capping position comes into contact with the liquid ejecting head 29, thereby forming a closed space surrounding the nozzles 30. Formation of the closed space by the cap 51 will also be referred to as capping.

The maintenance of the liquid ejecting head 29 involves suction cleaning. The suction cleaning is a mode of maintenance by discharging the liquid from the nozzles 30 while applying a negative pressure to the liquid in the liquid ejecting head 29. The maintenance portion 55 drives the suction pump P in a state where the caps 51 cap the liquid ejecting head 29, thus performing the suction cleaning. The liquid discharged as a result of the suction cleaning is drained from the waste liquid draining portion 61 through the waste liquid flow channel 62. At the same time, the liquid is collected as the waste liquid by the waste liquid container 60 coupled to the waste liquid draining portion 61.

The dividing portion 63 divides the waste liquid flow channel 62 into the upstream flow channel 65 and the downstream flow channel 64. The dividing portion 63 may be provided on the tray 50 in such a way as to fit inside of the tray 50 in the horizontal direction.

The upstream flow channel 65 and the downstream flow channel 64 are located at different positions from each other in the depth direction y. The dividing portion 63 couples the upstream flow channel 65 to the downstream flow channel 64. The upstream flow channel 65 is provided behind the downstream flow channel 64 in the depth direction y. In this way, the upstream flow channel 65 is provided at the back of the downstream flow channel 64 when viewed from the outside of the passage hole HL. In other words, the downstream flow channel 64 is provided between the upstream flow channel 65 and the passage hole HL.

Regarding Frame 32

Details of the frame 32 will be described below with reference to FIGS. 3 and 4.

Figure 3:
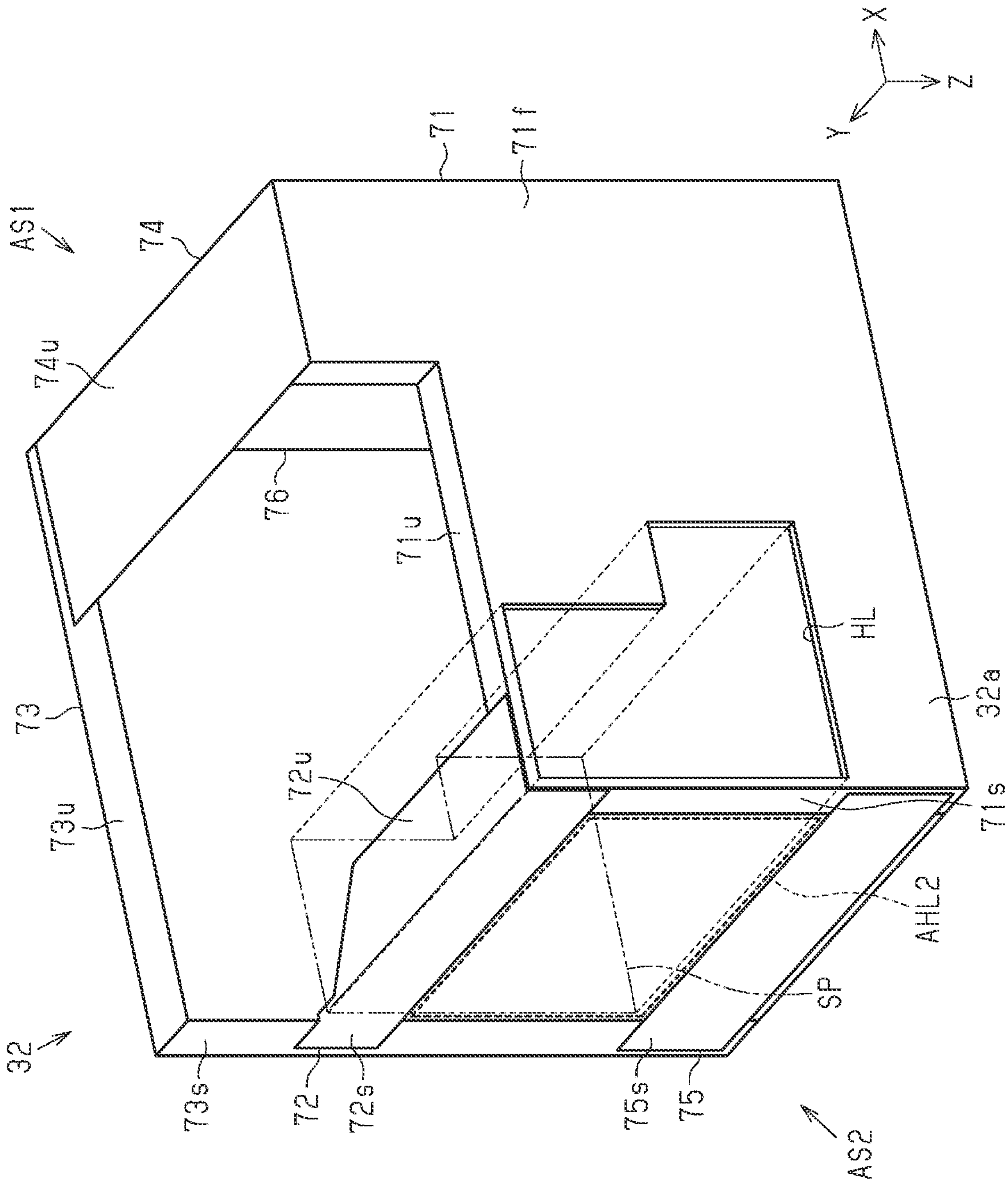
FIG. 3 is a perspective view of a frame.

As illustrated in FIG. 3, the frame 32 includes, for example, first to sixth frame bodies 71 to 76. Each of the first to sixth frame bodies 71 to 76 may be a bent metallic plate. The first frame body 71 and the third frame body 73 are disposed while providing a space in between in the depth direction y. The first frame body 71 is located in front of the third frame body 73. The second frame body 72 as well as the fourth frame body 74 to the sixth frame body 76 are provided between the first frame body 71 and the third frame body 73 in the depth direction y, and are fixed to the first frame body 71 and the third frame body 73.

The first frame body 71 includes a front wall **71*f* provided with the first surface 32*a*, and a first upper wall 71*u* and a first side wall 71*s* which are bent from the front wall 71*f*. The second frame body 72 includes a second side wall 72*s*, and a second upper wall 72*u* which is bent from the second side wall 72*s*. The third frame body 73 includes a rear wall 73*r*, and a third upper wall 73*u* and a third side wall 73*s* which are bent from the rear wall 73*r*. The fourth frame body 74 includes a fourth upper wall 74*u*. The sixth frame body 76 includes a not-illustrated fourth side wall. The fifth frame body 75 includes a fifth side wall 75*s***.

In the following description, a plane obtained by projecting the passage hole HL onto the third frame body 73 in the depth direction y will be referred to as a projection plane SP of the passage hole HL, or just simply as the projection plane SP. To be more precise, the projection plane SP is formed on the rear wall **73*r* of the third frame body 73. The rear wall 73*r* of this embodiment is parallel to the front wall 71*f***.

As illustrated in FIG. 1, when the projection plane SP is viewed in the depth direction y from the front of the frame 32 through the passage hole HL, the projection plane SP coincides with the passage hole HL. Part of the liquid flowing portion 40 is provided inside of the projection plane SP. To be more precise, in this embodiment, the attachment portion 43, the needle portions 46, the base 45, and part of the supply flow channels 47 are provided inside of the projection plane SP while part of the supply flow channels 47 and the coupling portion 41 are provided outside of the projection plane SP. The liquid ejecting head 29 is disposed outside of the projection plane SP. The tray 50 may be provided inside of the projection plane SP. The downstream flow channel 64 and the waste liquid draining portion 61 may be provided inside of the projection plane SP.

The liquid containers 35 and the waste liquid container 60 may be provided inside of the projection plane SP. When the liquid containers 35 and the waste liquid container 60 are provided inside of the projection plane SP, the liquid containers 35 and the waste liquid container 60 can be replaced through the passage hole HL. In other words, it is possible to take the liquid flowing portion 40 out of the passage hole HL for replacing at least one of the liquid containers 35 and the waste liquid container 60.

A portion of the liquid flowing portion 40 which runs off the projection plane SP of the passage hole HL is made deformable. In this embodiment, the portion that runs off the projection plane SP can be moved into the projection plane SP by deforming the deformation flow channel 42.

Figure 4:
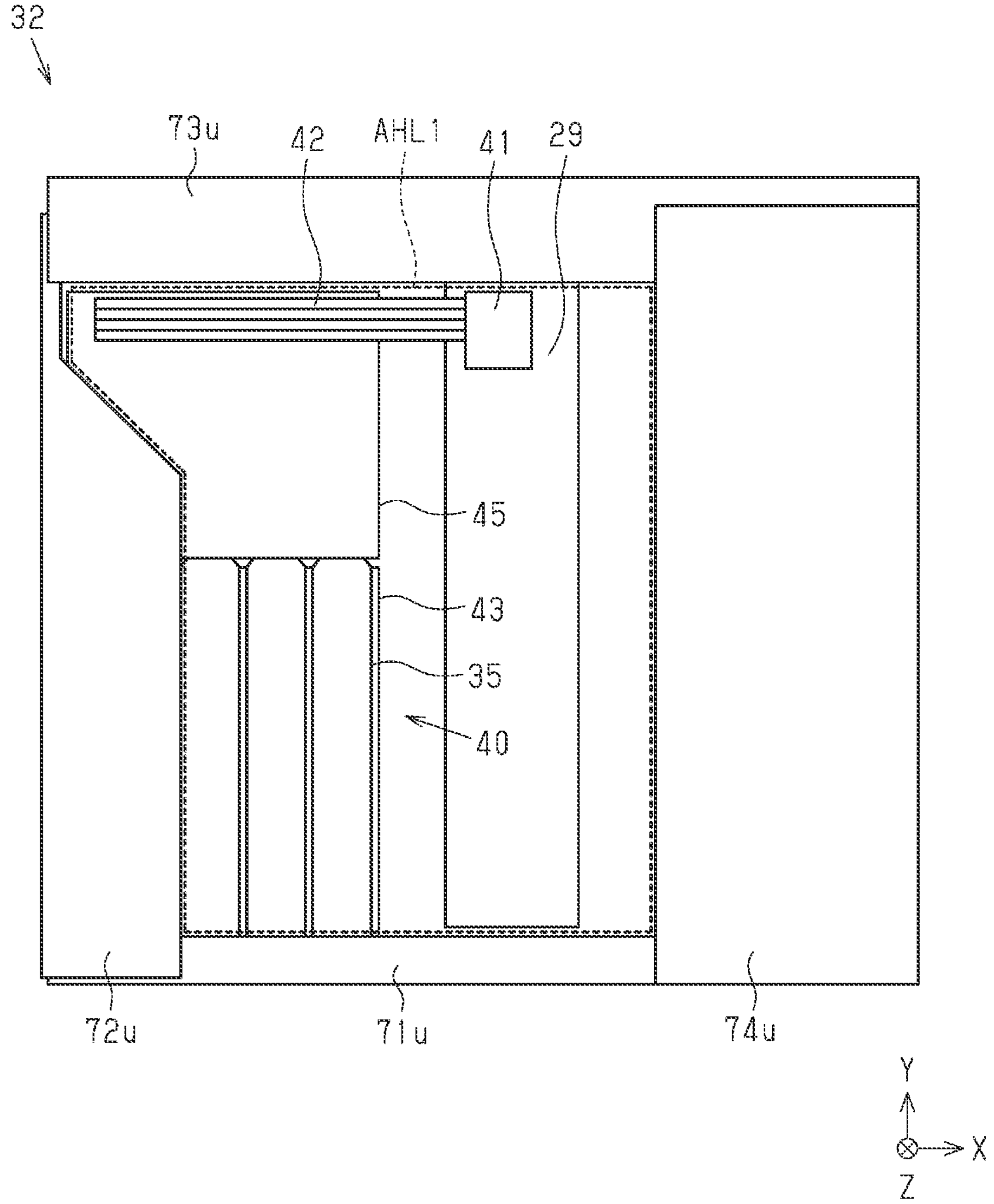
FIG. 4 is a top plan view of the frame.

As illustrated in FIGS. 3 and 4, the frame 32 may include a first access surface AS1. The first access surface AS1 is formed from first to fourth upper walls **71*u* to 74*u*. The first access surface AS1 may be provided with a first access hole AHL1 illustrated in FIG. 4, which allows an access to the coupling portion 41 and the holding portion 44**.

The first access hole AHL1 of this embodiment corresponds to a portion from the first upper wall **71*u* to the third upper wall 73*u* in the depth direction y and to a portion from the second upper wall 72*u* to the fourth upper wall 74*u* in the width direction x. In other words, the first access hole AHL1 corresponds a portion surrounded by the first to fourth frame bodies 71 to 74 when the frame 32** is viewed from above.

The worker can access the coupling portion 41 from above the first access hole AHL1. To be more precise, the worker can access the coupling portion 41 from the first access hole AHL1 and attach or detach the coupling portion 41 to and from the liquid ejecting head 29. When the coupling portion 41 is detached from the liquid ejecting head 29, the liquid flowing portion 40 is in a decoupled state of being separated from the liquid ejecting head 29. When the coupling portion 41 is coupled to the liquid ejecting head 29, the liquid flowing portion 40 is in a coupled state of being capable of supplying the liquid to the liquid ejecting head 29.

The liquid ejecting head 29 is formed to be capable of passing through the first access hole AHL1, for example. To be more precise, dimensions in the depth direction y and the width direction x of the liquid ejecting head 29 may be shorter than dimensions of the first access hole AHL1. When the liquid ejecting head 29 passes through the first access hole AHL1 at a tilt, the dimensions in the depth direction y and the width direction x of the liquid ejecting head 29 at a tilt may be shorter than the dimensions of the first access hole AHL1.

As illustrated in FIG. 3, the frame 32 may include a second access surface AS2. The second access surface AS2 is formed from the first to third side walls **71*s* to 73*s* and the fifth side wall 75*s*. The second access surface AS2 may be provided with a second access hole AHL2 which allows an access to the dividing portion 63. The second access hole AHL2 of this embodiment corresponds to a portion from the first side wall 71*s* to the third side wall 73*s* in the depth direction y and to a portion from the second side wall 72*s* to the fifth side wall 75*s* in the vertical direction z. In other words, the second access hole AHL2 corresponds a portion surrounded by the first to third frame bodies 71 to 73 and the fifth frame body 75 when the frame 32** is viewed sideways.

A description will be given of operations of this embodiment.

When detaching the liquid flowing portion 40, the worker first detaches the liquid container 35 that is attached to the attachment portion 43 through the passage hole HL. The worker accesses the coupling portion 41 from the first access hole AHL1 and detaches the coupling portion 41 from the liquid ejecting head 29. The first access hole AHL1 also allows an access to the holding portion 44 in addition to the coupling portion 41. Accordingly, the worker causes the holding portion 44 to hold the detached coupling portion 41.

The supply flow channel 47 provided with the deformation flow channel 42 is linked to the coupling portion 41. The holding portion 44 is located inside of the projection plane SP. Accordingly, when the coupling portion 41 moves to the holding portion 44, the deformation flow channel 42 is deformed and the supply flow channel 47 moves on with the coupling portion 41 into the projection plane SP. In other words, the portion of the liquid flowing portion 40 which runs off the projection plane SP moves into the projection plane SP.

The worker accesses the dividing portion 63 from the second access hole AHL2 and separates the waste liquid flow channel 62 into the upstream flow channel 65 and the downstream flow channel 64 by detaching the dividing portion 63. The dividing portion 63 may be detached prior to the coupling portion 41. By detaching the coupling portion 41 and the dividing portion 63, it is possible to take out the liquid flowing portion 40, the waste liquid draining portion 61, and the downstream flow channel 64 through the passage hole HL. The liquid flowing portion 40, the waste liquid draining portion 61, and the downstream flow channel 64 move in a take-out direction which is opposite to the depth direction y, thus passing through the passage hole HL and being taken out of the liquid ejecting apparatus 11.

The waste liquid container 60 may also be taken out together when taking out the liquid flowing portion 40. In other words, by taking out the waste liquid container 60 in the state of being attached to the waste liquid draining portion 61, the waste liquid container 60 can receive the leaking liquid even when the liquid in the downstream flow channel 64 leaks out of the waste liquid draining portion 61.

The tray 50 may also be taken out together when taking out the liquid flowing portion 40. In other words, even if the liquid leaks out of the needle portions 46, the coupling portion 41, the holding portion 44, the downstream flow channel 64, the waste liquid draining portion 61, and the like, it is possible to receive the leaking liquid with the tray 50 by moving the tray 50 together.

The procedures for the detachment are reversed when attaching the liquid flowing portion 40, the downstream flow channel 64, and the waste liquid draining portion 61. The liquid flowing portion 40, the waste liquid draining portion 61, and the downstream flow channel 64 are thrust in the depth direction y through the passage hole HL, and then the dividing portion 63 and the coupling portion 41 are coupled.

A description will be given of effects of this embodiment.

(1) The portion of the liquid flowing portion 40 which runs off the projection plane SP of the passage hole HL is made deformable. Accordingly, the worker can deform the liquid flowing portion 40 and move the portion that runs off the projection plane SP into the projection plane SP, for example. When the liquid flowing portion 40 fits into the projection plane SP, the liquid flowing portion 40 can pass through the passage hole HL. As a consequence, the worker can easily take the entire liquid flowing portion 40 out of the passage hole HL, and easily detach the entire liquid flowing portion 40 from the liquid ejecting apparatus 11.

(2) The liquid ejecting head 29 is disposed outside of the projection plane SP. Therefore, the liquid ejecting head 29 cannot pass through the passage hole HL. However, since the liquid flowing portion 40 includes the coupling portion 41, the liquid flowing portion 40 can easily be decoupled from the liquid ejecting head 29 by detaching the coupling portion 41 from the liquid ejecting head 29. Accordingly, the worker can easily take the liquid flowing portion 40 out of the passage hole HL by deforming the deformation flow channel 42 and fitting the coupling portion 41 into the projection plane SP.

(3) The frame 32 includes the first access surface AS1 provided with the first access hole AHL1. Accordingly, the worker can access the coupling portion 41 through the first access hole AHL1. Thus, the coupling portion 41 can easily be attached to or detached from the liquid ejecting head 29.

(4) The liquid ejecting head 29 is made capable of passing through the first access hole AHL1. Accordingly, the worker can easily take out the liquid ejecting head 29 through the first access hole AHL1.

(5) The attachment portion 43 includes the holding portion 44. The holding portion 44 can hold the deformation flow channel 42 which is deformable. Accordingly, the liquid flowing portion 40 can easily be taken out of the passage hole HL.

(6) The waste liquid flow channel 62 includes the dividing portion 63. The dividing portion 63 can divide the flow channel linked to the maintenance portion 55 and the downstream flow channel 64 linked to the waste liquid draining portion 61. The downstream flow channel 64 is provided inside of the projection plane SP. Accordingly, it is possible to take the downstream flow channel 64 out of the passage hole HL in addition to the liquid flowing portion 40.

(7) The waste liquid flow channel 62 includes the upstream flow channel 65 that links the maintenance portion 55 to the dividing portion 63. In other words, the dividing portion 63 can divide the waste liquid flow channel 62 into the upstream flow channel 65 and the downstream flow channel 64. The downstream flow channel 64 is provided between the upstream flow channel 65 and the passage hole HL. Accordingly, it is possible to keep the upstream flow channel 65 from interfering with the downstream flow channel 64 when downstream flow channel 64 is taken out of the passage hole HL.

(8) The frame 32 includes the second access surface AS2 provided with the second access hole AHL2. Accordingly, the worker can access the dividing portion 63 through the second access hole AHL2 and easily divide the waste liquid flow channel 62.

(9) The tray 50 is provided inside of the projection plane SP, and can therefore be taken out of the passage hole HL. The attachment portion 43 fits inside of the tray 50 in the horizontal direction. Accordingly, the tray 50 can receive the leaking liquid even when the liquid leaks out of the liquid container 35 attached to the attachment portion 43, for example.

(10) The attachment portion 43, the dividing portion 63, and the waste liquid draining portion 61 are located inside of the tray 50 in the horizontal direction. Accordingly, the tray 50 can receive the leaking liquid in case of the ink leakage from the attachment portion 43, the dividing portion 63, or the waste liquid draining portion 61, for example.

This embodiment can be carried out by way of modifications as described below. This embodiment and any of the following modified examples can be carried out in combination within a technically consistent range.

The housing 12 may include a not-illustrated openable/closable cover. The cover may be located at a closed position so as to cover the passage hole HL or located at an open position so as to expose the passage hole HL. The housing 12 may include a plurality of covers. Each cover may cover the first access hole AHL1 and the second access hole AHL2. The liquid ejecting apparatus 11 may cause the stacker 18 to function as a cover for covering the first access hole AHL1. In other words, the liquid ejecting apparatus 11 may include the openable/closable stacker 18 and expose the first access hole AHL1 by moving the stacker 18 to the open position.

The liquid flowing portion 40 may include a reservoir portion to reserve the liquid. The liquid flowing portion 40 may include a collection flow channel for collecting the liquid in the liquid ejecting head 29 and sending the liquid to the reservoir portion. An upstream end of the collection flow channel may be coupled to liquid ejecting head 29 while a downstream end thereof may be coupled to the reservoir portion or the supply flow channel 47. The liquid flowing portion 40 may circulate the liquid by collecting the liquid, which is supplied to the liquid ejecting head 29 through the supply flow channel 47, by using the collection flow channel. In other words, the liquid flowing portion 40 may include a circulation flow channel formed from the supply flow channel 47 and the collection flow channel. Both the supply flow channel 47 and the collection flow channel may be detachably coupled to the liquid ejecting head 29 through the coupling portion 41 even in this case. In addition, at least part of each of the supply flow channel 47 and the collection flow channel may be deformable.

The liquid ejecting apparatus 11 may be provided with a not-illustrated rail for guiding a movement of the liquid flowing portion 40. Provision of the rail can stabilize the movement of the liquid flowing portion 40 when taking the liquid flowing portion 40 out of the passage hole HL or when attaching the liquid flowing portion 40 through the passage hole HL. The liquid ejecting apparatus 11 may include a rail for guiding the movement of at least one of the liquid container 35, the waste liquid container 60, and the tray 50.

The liquid ejecting apparatus 11 may include the maintenance portion 55 that carries out pressurized cleaning as the maintenance of the liquid ejecting head 29. The pressurized cleaning is a mode of maintenance of applying a pressure to the liquid in the liquid ejecting head 29 and discharging the liquid out of the nozzles 30. The liquid ejecting apparatus 11 may include the maintenance portion 55 that carries out flushing as the maintenance of the liquid ejecting head 29. The flushing is a mode of maintenance of ejecting the liquid out of the nozzles. The maintenance portion 55 may include a liquid receiving portion that receives the liquid discharged by the pressurized cleaning or the flushing. In this case, the suction pump P may be used for draining the liquid that is discharged in the caps 51.

The second frame body 72 may be integrated with the fifth frame body 75. When the second frame body 72 and the fifth frame body 75 are realized by using a single member, the second access hole AHL2 is the hole provided to this member. Another frame body may be provided between the second frame body 72 and the fifth frame body 75. In this case, of a hole between the second frame body 72 and the other frame body and a hole between the other frame body and the fifth frame body 75, the hole provided at a position that allows an access to the dividing portion 63 serves as the second access hole AHL2.

At least part of the tray 50 may be provided outside of the projection plane SP. Specifically, the tray 50 does not always have to be detached through the passage hole HL. For example, the tray 50 may be formed to be capable of passing through the second access hole AHL2.

The waste liquid flow channel 62 and the waste liquid draining portion 61 may remain in the liquid ejecting apparatus 11 when detaching the liquid flowing portion 40. In this case, the dividing portion 63 need not be detached and the second access hole AHL2 do not have to be provided.

The upstream flow channel 65 and the downstream flow channel 64 may be arranged in the vertical direction z. In other words, when the upstream flow channel 65 is not located between the passage hole HL and the downstream flow channel 64 in the depth direction y, the downstream flow channel 64 can be taken out of the passage hole HL without interfering with the upstream flow channel 65.

The holding portion 44 may be provided at a different position from the attachment portion 43 as long as the holding portion 44 stays within the projection plane SP. The holding portion 44 may be included in the liquid container 35. The liquid flowing portion 40 may be taken out of the passage hole HL while attaching the liquid container 35 thereto.

The liquid ejecting head 29 may be configured not to pass through the first access hole AHL1. For example, the liquid ejecting head 29 may be configured to pass through the passage hole HL, the second access hole AHL2, or a different hole. The coupling portion 41 may be accessed through the passage hole HL, the second access hole AHL2, or the different hole. The liquid ejecting apparatus 11 does not have to be provided with the first access hole AHL1.

Second Embodiment

A liquid receiving tray and a liquid ejecting apparatus according to a second embodiment will be described below with reference to the drawings. A liquid ejecting apparatus 111 of this embodiment is, for example, an ink jet printer that performs printing by ejecting an ink representing an example of a liquid onto a medium 113 such as a paper sheet. In the following, a description will be given of the liquid ejecting apparatus 111 prior to a description of a liquid receiving tray 170 for the convenience of explanation.

In the drawings, a direction of gravitational force is indicated with a z axis on the assumption that the liquid ejecting apparatus 111 is placed on a horizontal plane, and directions along the horizontal plane are indicated with an x axis and a y axis. The x axis, the y axis, and the z axis are orthogonal to one another. In the following description, a direction parallel to the x axis will also be referred to as a width direction x, a direction parallel to the y axis will also be referred to as a depth direction y, and a direction parallel to the z axis will also be referred to as a vertical direction z.

Basic Configuration of Liquid Ejecting Apparatus

Figure 5:
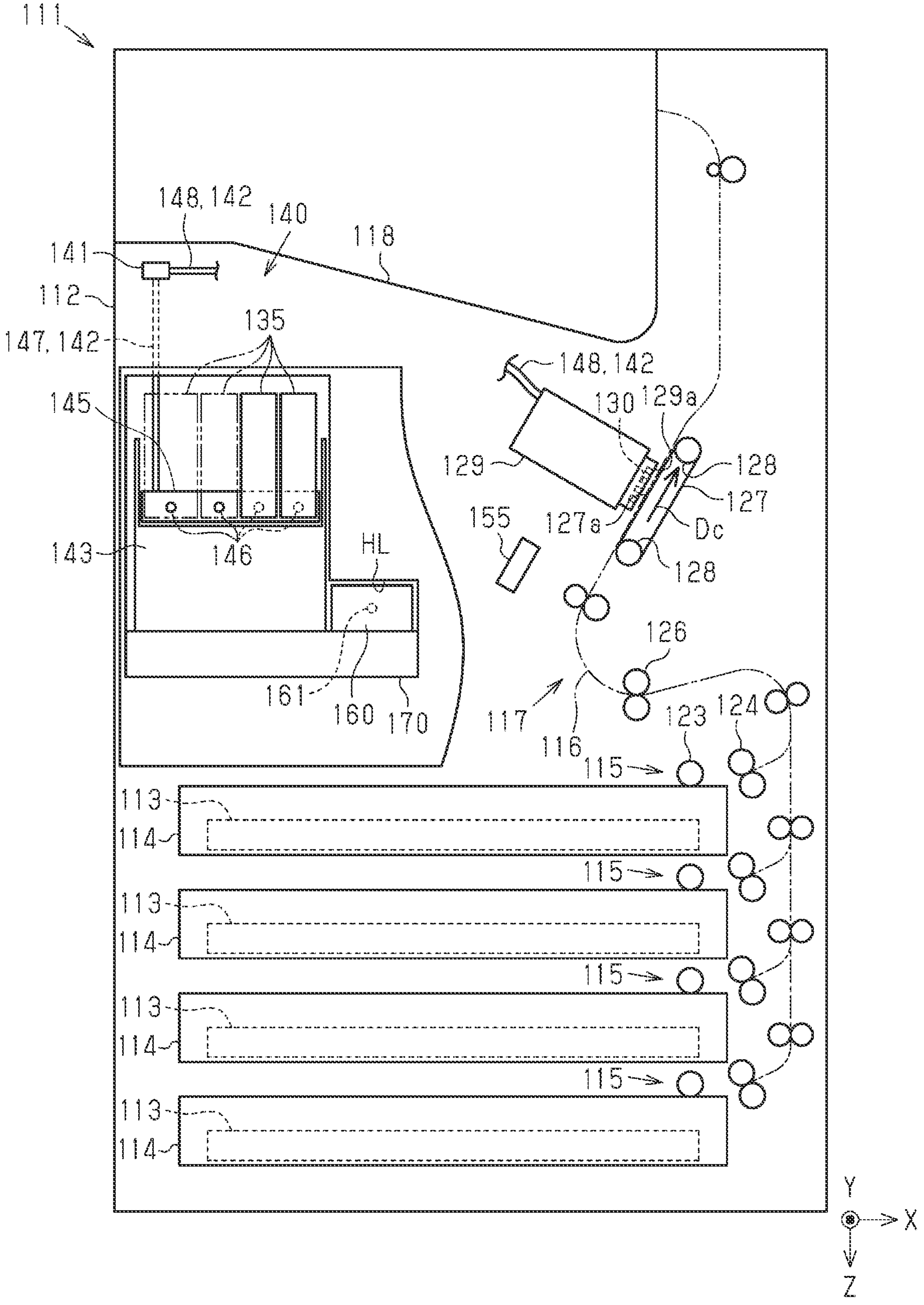
FIG. 5 is a schematic diagram illustrating a liquid ejecting apparatus according to a second embodiment.

As illustrated in FIG. 5, the liquid ejecting apparatus 111 may include a housing 112, a medium container 114 capable of containing the medium 113, and a feeding portion 115 that feeds the medium 113. The liquid ejecting apparatus 111 may include a transporting portion 117 that transports the medium 113 along a transportation route 116 indicated with a chain line in FIG. 5, and a stacker 118 that receives the medium 113. The transportation route 116 is a route that links the medium container 114 to the stacker 118.

The medium container 114 can contain the media 113 in a stacked state. The liquid ejecting apparatus 111 may include a plurality of medium containers 114 and the feeding portions 115 as many as the medium containers 114. Each feeding portion 115 may include a feed roller 123 that feeds the media 113 contained in the medium container 114, and a separating portion 124 that separates the media 113 one by one. The feeding portion 115 sends the media 113 contained in the medium container 114 out to the transportation route 116.

The transporting portion 117 may include a transportation roller 126, an endless transportation belt 127, and a pair of pulleys 128. Here, the transportation belt 127 is wound around the pulleys 128. The transporting portion 117 may include a plurality of transportation rollers 126. The transportation rollers 126 are rotated in a state of pinching the medium 113, thereby transporting the medium 113.

The transportation belt 127 includes a transportation surface 127*a* to transport the medium 113. The transportation surface 127*a* is a flat surface out of an outer peripheral surface of the transportation belt 127, which is designed to support the medium 113 by electrostatic adsorption, for example. The transportation surface 127*a* constitutes part of the transportation route 116. The transportation surface 127*a* of the transportation belt 127 may be inclined with respect to the horizontal surface. In this embodiment, a direction extending along the transportation surface 127*a* for transporting the medium 113 will be referred to as a transporting direction Dc. The transportation belt 127 goes around while supporting the medium 113 onto the transportation surface 127*a*, thus transporting the medium 113 in the transporting direction Dc.

Configuration of Liquid Ejecting Head

The liquid ejecting apparatus 111 includes a liquid ejecting head 129 that ejects a liquid. The liquid ejecting head 129 includes a nozzle surface 129*a* on which nozzles 130 are open. The nozzle surface 129*a* is formed from a nozzle plate on which the nozzles 130 are open. The liquid ejecting head 129 ejects the liquid from the nozzles 130 to the medium 113 and performs printing on the medium 113. The nozzle surface 129*a* of the liquid ejecting head 129 may be inclined with respect to the horizontal surface. The liquid ejecting head 129 of this embodiment is of a line type which can eject the liquid across a width direction of the medium 113. The liquid ejecting head 129 is provided such that a long direction of the liquid ejecting head 129 coincides with the depth direction y.

The liquid ejecting head 129 may be made movable to a printing position and to a maintenance position by using a not-illustrated movement mechanism. The printing position is a position where the liquid ejecting head 129 ejects the liquid and performs printing on the medium 113. The maintenance position is a position where maintenance of the liquid ejecting head 129 is carried out. The liquid ejecting head 129 may stand by at the maintenance position when the liquid ejecting head 129 is not printing.

Configuration of Liquid Flowing Portion

The liquid ejecting apparatus 111 includes a liquid flowing portion 140 that can flow the liquid. The liquid flowing portion 140 communicates with the liquid ejecting head 129. The communication of the liquid flowing portion 140 with the liquid ejecting head 129 means that the liquid flowing portion 140 is linked to the liquid ejecting head 129 so that the liquid can be supplied from the liquid flowing portion 140 to the liquid ejecting head 129. The liquid flowing portion 140 may include an attachment portion 143, needle portions 146 provided to the attachment portion 143, and a base 145 that supports the needle portions 146.

A liquid container 135 containing the liquid is detachably attached to the attachment portion 143. A plurality of liquid containers 135 may be made attachable to the attachment portion 143. The number of the needle portions 146 may be equal to the number of the liquid containers 135 attachable to the attachment portion 143.

The liquid flowing portion 140 may include a flow channel 142 to flow the liquid. A plurality of flow channels 142 may be provided. Of the flow channels 142, one or more of the flow channels 142 are referred to as first flow channels 147 and the rest of the flow channels 142 are referred to as second flow channels 148. The number of the first flow channel or channels 147 is equal to the number of the second flow channels 148.

The liquid flowing portion 140 includes a joint portion 141 to which the flow channels 142 are detachably coupled. The first flow channels 147 and the second flow channels 148 may be coupled as the flow channels 142 to the joint portion 141. Each first flow channel 147 is located upstream of the joint portion 141. Each second flow channel 148 is located downstream of the joint portion 141. The first flow channel 147 links the corresponding needle portion 146 to the joint portion 141. The second flow channel 148 links the joint portion 141 to the liquid ejecting head 129. The second flow channel 148 may be deformable. The second flow channel 148 may be formed from a flexible tube, or may be constructed to be deformable by using a bellows and the like, for example.

The numbers of the first flow channels 147 and the second flow channels 148 may be equal to the number of the liquid containers 135 attachable to the attachment portion 143. When the liquid containers 135 are attachable to the attachment portion 143, the liquid flowing portion 140 may include a plurality of first flow channels 147 and a plurality of second flow channels 148, respectively. The first flow channels 147 and the second flow channels 148 may be integrally coupled to the single joint portion 141. In this case, the liquid flowing portion 140 may be provided with the single joint portion 141. The single first flow channel 147 and the single second flow channel 148 may be coupled to the joint portion 141. In this case, the number of the joint portions 141 to be provided to the liquid flowing portion 140 may be equal to the number of the liquid containers 135 attachable to the attachment portion 143.

Configuration of Maintenance Portion

The liquid ejecting apparatus 111 may include a maintenance portion 155 that conducts maintenance of the liquid ejecting head 129. The maintenance portion 155 conducts the maintenance of the liquid ejecting head 129 when the liquid ejecting head 129 is located at the maintenance position.

Figure 6:
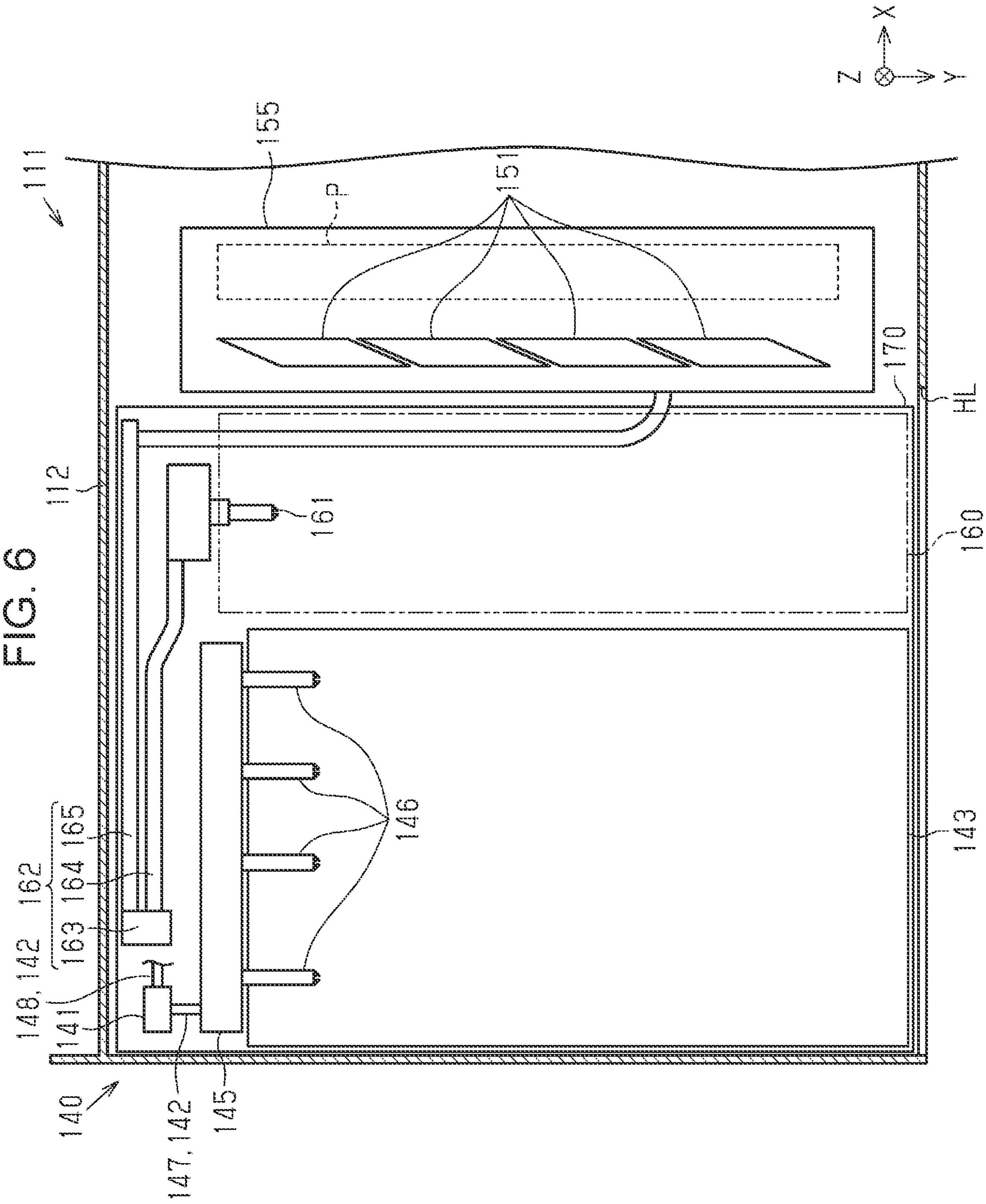
FIG. 6 is a schematic diagram illustrating a liquid flowing portion and a maintenance portion.

As illustrated in FIG. 6, the maintenance portion 155 may include one or more caps 151 that performs capping the liquid ejecting head 129 and a suction pump P that can suction the inside of the caps 151. The maintenance portion 155 performs capping while bringing each cap 151 into contact with the liquid ejecting head 129 located at the maintenance position, thereby forming a closed space surrounding the nozzles 130. The cap 151 may be movable to a contact position to come into contact with the liquid ejecting head 129 and to a detachment position to be detached from the liquid ejecting head 129 when the liquid ejecting head 129 is located at the maintenance position.

The maintenance portion 155 may perform suction cleaning that represents an example of the maintenance. The suction cleaning is carried out by driving the suction pump P in the capped state of the liquid ejecting head 129. The maintenance may also be flushing, in which the liquid is ejected from the nozzles 130 as a waste liquid.

Configuration of Draining Portion

The liquid ejecting apparatus 111 may include a draining portion 161. The draining portion 161 drains the liquid discharged from the liquid ejecting head 129 in the course of the maintenance as the waste liquid. A waste liquid container 160 is detachably coupled to the draining portion 161. The waste liquid container 160 contains the waste liquid drained from the draining portion 161.

Configuration of Waste Liquid Flow Channel

The liquid ejecting apparatus 111 may include a waste liquid flow channel 162 that links the maintenance portion 155 to the draining portion 161. The waste liquid flow channel 162 may include a coupling portion 163, a downstream flow channel 164 that links the coupling portion 163 to the draining portion 161, and an upstream flow channel 165 that links the maintenance portion 155 to the coupling portion 163. The coupling portion 163 couples the upstream flow channel 165 to the downstream flow channel 164. The downstream flow channel 164 is made attachable to and detachable from the coupling portion 163.

Flow of Waste Liquid

The liquid discharged from the liquid ejecting head 129 in the course of the maintenance by the maintenance portion 155 is drained from the draining portion 161 through the waste liquid flow channel 162. The liquid drained from the draining portion 161 is collected as the waste liquid in the waste liquid container 160 coupled to the draining portion 161.

Attachment and Detachment of Joint Portion to and from Flow Channel

The worker may be able to access the joint portion 141 through a not-illustrated access hole in the housing 112. The worker can attach and detach the joint portion 141 to and from at least one of the first flow channel 147 and the second flow channel 148 by accessing the joint portion 141. When the joint portion 141 is detached from the second flow channel 148, for example, the liquid flowing portion 140 except the second flow channel 148 is separated from the liquid ejecting head 129. When the joint portion 141 in the state of being detached from the second flow channel 148 is coupled to the second flow channel 148, the liquid flowing portion 140 can supply the liquid to the liquid ejecting head 129.

Attachment and Detachment of Coupling Portion to and from Waste Liquid Flow Channel The worker may be able to access the coupling portion 163 through a not-illustrated access hole in the housing 112. The access hole allowing the access to the coupling portion 163 and the access hole allowing the access to the joint portion 141 may be different holes or a common hole.

The worker can attach and detach the coupling portion 163 to and from at least one of the downstream flow channel 164 and the upstream flow channel 165 by accessing the coupling portion 163. When the coupling portion 163 is detached from the downstream flow channel 164, for example, the downstream flow channel 164, the draining portion 161, and the waste liquid container 160 are separated from the maintenance portion 155. When the coupling portion 163 in the state of being detached from the downstream flow channel 164 is coupled to the downstream flow channel 164, the liquid received by the maintenance portion 155 can be drained to the waste liquid container 160 through the waste liquid flow channel 162 and the draining portion 161.

Replacement of Liquid Container 135 and Waste Liquid Container 160

As illustrated in FIG. 5, the worker may replace the liquid container 135 and the waste liquid container 160 by taking the liquid container 135 and the waste liquid container 160 out of the passage hole HL of the housing 112. The passage hole HL may be located at a front face of the housing 112 in the depth direction y.

As illustrated in FIG. 6, the worker may take a portion of the liquid flowing portion 140 out of the passage hole HL by detaching the joint portion 141 from at least one of the first flow channel 147 and the second flow channel 148. When the worker detaches the joint portion 141 from the second flow channel 148, for example, the liquid flowing portion 140 except the second flow channel 148 is taken out of the passage hole HL. The worker may take the draining portion 161 and the downstream flow channel 164 out of the passage hole HL by detaching the coupling portion 163 from the downstream flow channel 164. Part of the liquid flowing portion 140, the draining portion 161, and the downstream flow channel 164 pass through the passage hole HL while moving in a take-out direction that coincides with the depth direction y, thus being taken out of the liquid ejecting apparatus 111.

When the liquid flowing portion 140 is taken out of the liquid ejecting apparatus 111, the waste liquid container 160 may also be taken out together through the passage hole HL. The waste liquid container 160 may be taken out of the liquid ejecting apparatus 111 in the state of being attached to the draining portion 161.

When part of the liquid flowing portion 140, the draining portion 161, and the downstream flow channel 164 are attached to the liquid ejecting apparatus 111, these constituents are attached in the reverse order to the case of detaching the constituents from the liquid ejecting apparatus 111. Specifically, the worker thrusts part of the liquid flowing portion 140, the draining portion 161, and the downstream flow channel 164 in the opposite direction to the depth direction y through the passage hole HL to begin with. Then, the worker couples the coupling portion 163 to the downstream flow channel 164. The worker further couples the joint portion 141 to the second flow channel 148.

Configuration of Liquid Receiving Tray

The liquid ejecting apparatus 111 includes the liquid receiving tray 170. The liquid receiving tray 170 may be disposed below the joint portion 141. The liquid receiving tray 170 of this embodiment is disposed below the liquid flowing portion 140 inclusive of the joint portion 141. The liquid receiving tray 170 may be disposed below the draining portion 161 and the coupling portion 163. Part of the attachment portion 143 and part of the waste liquid container 160 in the vertical direction z may be located inside of the liquid receiving tray 170. When the attachment portion 143, the waste liquid container 160, and the liquid receiving tray 170 are viewed from above, the attachment portion 143 and the waste liquid container 160 fit inside of the liquid receiving tray 170. Dimensions in the width direction x and the depth direction y of each of the attachment portion 143 and the waste liquid container 160 are smaller than the dimensions of the liquid receiving tray 170. The attachment portion 143 and the waste liquid container 160 are adjacent to each other in the width direction x.

The liquid receiving tray 170 may be attachable to and detachable from the liquid ejecting apparatus 111. The liquid receiving tray 170 may be taken out of the liquid ejecting apparatus 111 by allowing the worker to displace the liquid receiving tray 170 in the depth direction y through the passage hole HL of the housing 112.

When the worker takes the liquid flowing portion 140 and the waste liquid container 160 out of the liquid ejecting apparatus 111, the liquid receiving tray 170 may be capable of being taken out together. By moving the liquid receiving tray 170 together with the liquid flowing portion 140 and the waste liquid container 160, the liquid receiving tray 170 can receive the leaking liquid even when the liquid leaks out of the needle portion 146, the downstream flow channel 164, the draining portion 161, and the like.

Figure 7:
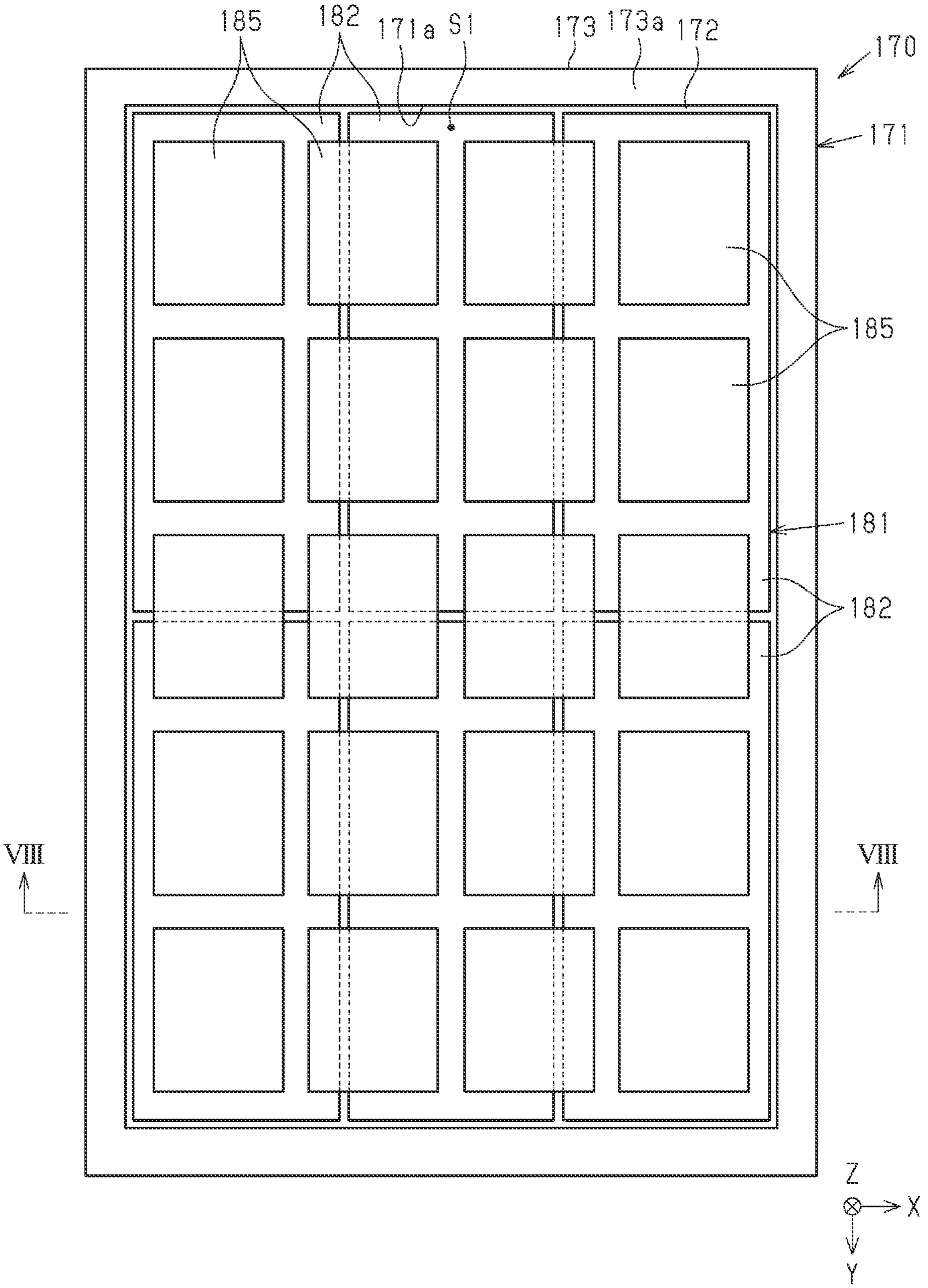
FIG. 7 is a top plan view illustrating a liquid receiving tray.

As illustrated in FIG. 7, the liquid receiving tray 170 includes a tray 171 that can receive the liquid, a capillary force generating portion 181 provided to the tray 171 and configured to generate a capillary force, and an absorber 185 disposed to overlap the capillary force generating portion 181 in such a way as to come into contact with the capillary force generating portion 181. In this embodiment, the capillary force generating portion 181 is located on the tray 171. The absorber 185 is located on the capillary force generating portion 181.

Configuration of Tray

The tray 171 may include a bottom wall 172 provided with the capillary force generating portion 181, and side walls 173 extending from the bottom wall 172. The capillary force generating portion 181 is provided on the bottom wall 172. The bottom wall 172 may have a rectangular flat plate shape that extends orthogonally to the vertical direction z. The side walls 173 of this embodiment may extend upward from four sides on the periphery of the bottom wall 172. An internal space S1 is defined inside of the tray 171 by using the bottom wall 172 and the side walls 173. An opening 171*a* is located above the tray 171. The opening 171*a* is defined by upper ends 173*a* of the side walls 173 in such a way as to take on a rectangular shape when viewed from above. The opening 171*a* is linked to the internal space S1 of the tray 171.

Figure 8:
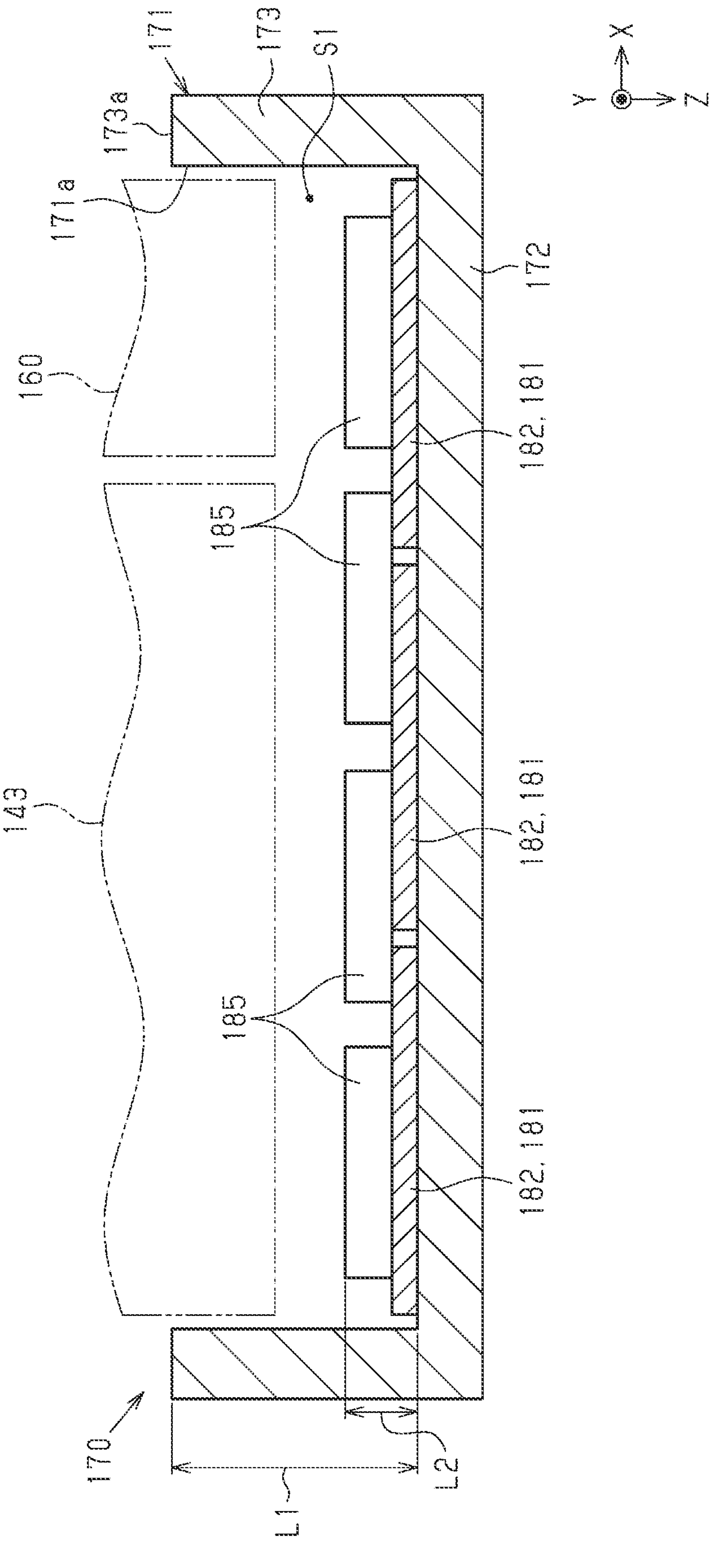
FIG. 8 is a cross-sectional view taken along the VIII-VIII line in FIG. 7.

As illustrated in FIG. 8, the upper ends 173*a* of the side walls 173 may be provided at positions higher than an uppermost portion of the absorber 185 before absorbing the liquid. In other words, a first dimension L1 being a dimension in the vertical direction z from an upper surface of the bottom wall 172 to the upper end 173*a* of each side wall 173 may be larger than a second dimension L2 being a sum of dimensions in the vertical direction z of the capillary force generating portion 181 and the absorber 185.

Part in the vertical direction z of the attachment portion 143 and part in the vertical direction z of the waste liquid container 160 may be located inside of the tray 171. In this case, when the absorber 185 absorbs the liquid inside the tray 171, the absorber 185 may swell up to such a height to abut on a lower portion of the attachment portion 143 and a lower portion of the waste liquid container 160. The upper ends 173*a* of the side walls 173 may be provided at positions higher than a swellable height of the absorber 185 when the absorber 185 absorbs the liquid. The swellable height of the absorber 185 when the absorber 185 absorbs the liquid corresponds to such a height that the lower part of the attachment portion 143 and the lower part of the waste liquid container 160 are located inside of the tray 171.

Configuration of Capillary Force Generating Portion

The capillary force generating portion 181 is capable of holding the liquid and transferring the held liquid to the absorber 185. The capillary force generating portion 181 may include a transfer member 182 that can transfer the liquid. The transfer member 182 is a non-woven fabric, for example.

The absorber 185 may be located on the transfer member 182. When the liquid drips onto the transfer member 182, the liquid permeates the transfer member 182. The liquid that permeates the transfer member 182 spreads into the transfer member 182 and is transferred from the transfer member 182 to the absorber 185 located on the transfer member 182. In this way, the transfer member 182 can transfer the liquid to the absorber 185.

The transfer member 182 may be bonded to the tray 171. For example, the transfer member 182 is bonded to the tray 171 by using a double-sided tape, an adhesive agent, and the like. The transfer member 182 is bonded to the bottom wall 172 of the tray 171, and is thus located on the bottom wall 172.

As illustrated in FIG. 7, a shape in plan view of the transfer member 182 may be a rectangular shape. The capillary force generating portion 181 may include a plurality of transfer members 182. The transfer members 182 may be arranged adjacent to one another in the width direction x. Sets of transfer members 182 adjacent to one another in the width direction x may be arranged in the depth direction y. For example, three transfer members 182 are arranged adjacent to one another in the width direction x in this embodiment. For example, two sets of the three transfer members 182 adjacent to one another in the width direction x are arranged in the depth direction y in this embodiment. The transfer members 182 are located away from one another in the width direction x and in the depth direction y.

Configuration of Absorber

The liquid receiving tray 170 may include a plurality of absorbers 185. The absorbers 185 may be arranged adjacent to one another in the width direction x. Sets of absorbers 185 adjacent to one another in the width direction x may be arranged in the depth direction y. For example, four absorbers 185 are arranged adjacent to one another in the width direction x in this embodiment. For example, five sets of the four absorbers 185 adjacent to one another in the width direction x are arranged in the depth direction y in this embodiment. The absorbers 185 are located away from one another in the width direction x and in the depth direction y. At least part of the absorbers 185 may be located on the transfer members 182 in such a way as to extend across the transfer members 182.

Figure 9:
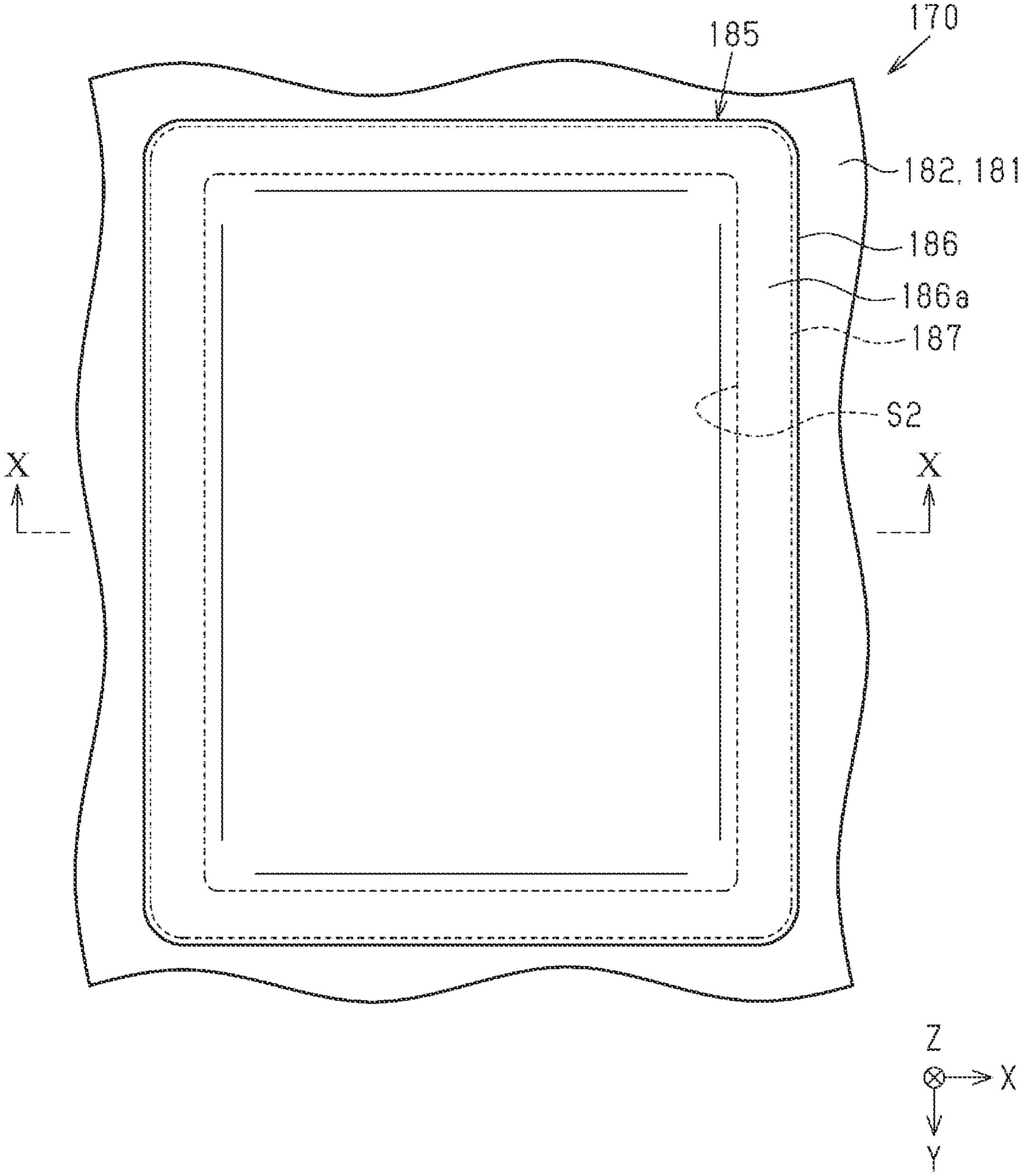
FIG. 9 is a partially enlarged top plan view illustrating the liquid receiving tray.
Figure 10:
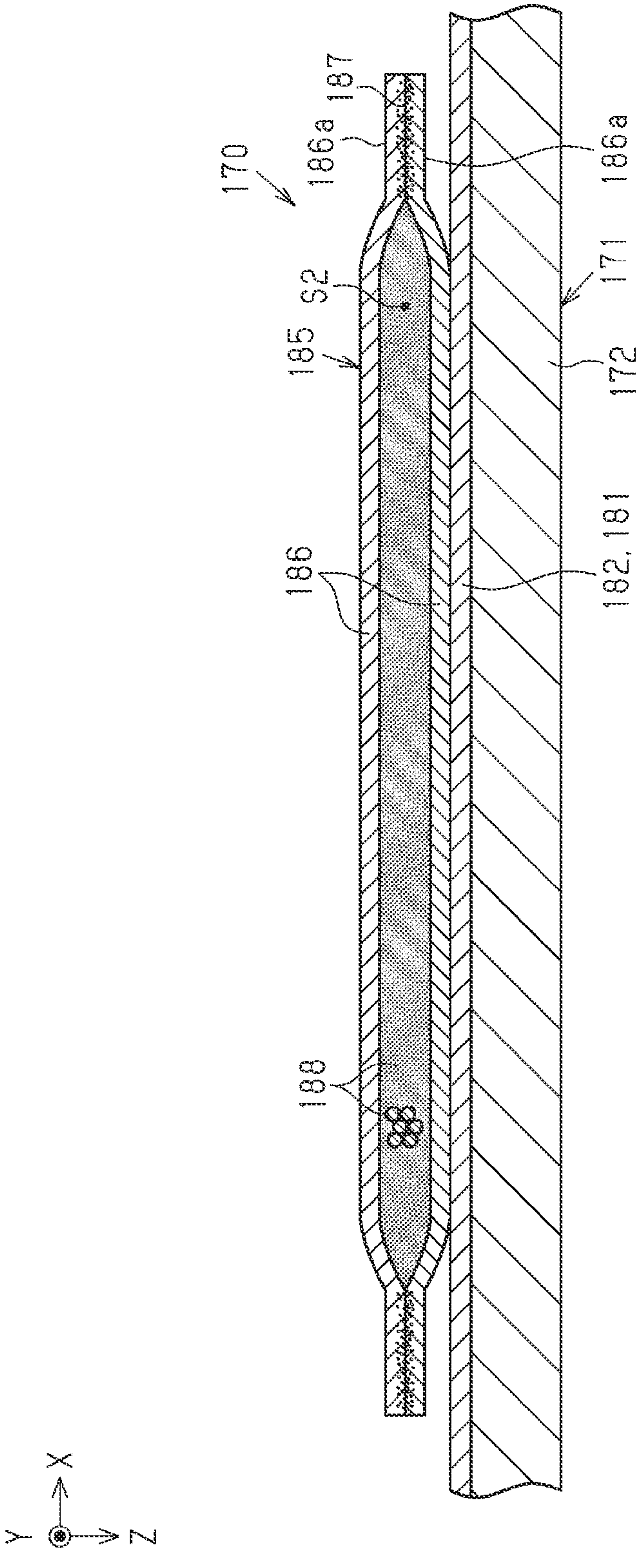
FIG. 10 is a cross-sectional view taken along the X-X line in FIG. 9.

As illustrated in FIGS. 9 and 10, each absorber 185 includes two sheets 186 that can transfer the liquid. The two sheets 186 may be formed from the same material or materials that are different from each other.

As illustrated in FIG. 10, the absorber 185 includes a plurality of polymer absorbers 188. Each of the absorbers 185 is formed by sandwiching the polymer absorbers 188 between the two sheets 186. The polymer absorbers 188 before absorbing the liquid may take on any shape such as a scaly shape, an acicular shape, a fibrous shape, and a granular shape. However, it is preferable that the majority of the polymer absorbers 188 takes on the granular shape. In FIG. 10, part of the polymer absorbers 188 are illustrated into the granular shapes and the rest of the polymer absorbers 188 are simply illustrated with dot hatching.

Configuration of Two Sheets

The two sheets 186 may be formed from a material containing fibers. The sheets 186 of this embodiment are made of a non-woven fabric, for example. Examples of the fibers constituting the sheets 186 include: synthetic resin fibers such as polyester fibers and polyamide fibers; natural resin fibers such as cellulose fibers, keratinous fibers, and fibroin fibers as well as chemical modifications thereof; and the like. One of these fibers may be used as the material of the two sheets 186 or a mixture of two or more types of the fibers may be used as the material of the two sheets 186. The fibers used as the material of the two sheets 186 may contain the cellulose fibers as its main component. It is more preferable that substantially all the fibers constituting the two sheets 186 be the cellulose fibers.

In this specification, the cellulose fibers only need to be substances that take on the fibrous shape and mainly contain cellulose as a compound. Besides this cellulose, the cellulose fibers in this specification may contain at least one of hemicellulose and lignin. The cellulose is a material having an appropriate hydrophilic property. For this reason, when the cellulose fibers are used as the material of the two sheets 186, the sheets 186 can appropriately capture the liquid that adheres to the sheets 186.

Besides the fibers, at least one of the two sheets 186 may contain binder as its material for binding the fibers to one another. When this sheet 186 is formed from the material containing the binder, a strength of the sheet 186 is increased so that the sheet 186 can be prevented from breakage other than breakage at bonding portions 187.

Although the binder adopted as the material of the sheets 186 is not limited to a particular material, the binder may be a thermoplastic resin. Examples of the thermoplastic resin include: AS resin; ABS resin; polyolefin such as polyethylene, polypropylene, and ethylene-vinyl acetate copolymer (EVA); modified polyolefin; acrylic resin such as polymethyl methacrylate; polyvinyl chloride; polystyrene; polyester such as polyethylene terephthalate and polyebutylene terephthalate; polyamide (nylon) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide; polyetherimde; liquid polymers such as aromatic polyester; various thermoplastic elastomers such as styrene-based, polyolefin-based, polyvinyl chloride-based, polyurethane-based, polyester-based, polyamide-based, polybutadiene-based, trans polyisoprene-based, fluorine-containing rubber-based, and chlorinated polyethylene-based elastomers; and the like. Among these thermoplastic resins, a single type of the thermoplastic resin may be adopted as the binder constituting the two sheets 186 or a combination of two or more types of the thermoplastic resins may be adopted as the binder. Preferably, one of polyester and a combination of polyester and a different thermoplastic resin may be adopted as the binder constituting the two sheets 186.

Besides the thermoplastic resins, the types of the binder adoptable as the material of the sheets 186 include hardening resins, starch, dextrin, glycogen, amylose, hyaluronic acid, kudzu, konjac, dogtooth violet starch, etherized starch, esterified starch, natural gum glue, fiber derivative glue, seaweeds, and animal protein. Examples of the natural gum glue include etherized tamarind gum, etherized locust bean gum, etherized guar gum, acacia Arabic gum, and the like. Examples of the fiber derivative glue include etherized carboxymethyl cellulose, hydroxyethyl cellulose, and the like. Examples of the seaweeds include sodium alginate, agar, and the like. Examples of the animal protein include collagen, gelatin, hydrolyzed collagen, sericin, and the like.

A material other than the fibers and the binder may also be used as the material constituting the sheets 186. Examples of the material other than the fibers and the binder include a colorant for coloring the fibers, an agglomeration inhibitor for inhibiting agglomeration of the fibers and agglomeration of the binder, a flame retardant for rendering the fibers less flammable, a strengthening agent for increasing paper strength of the two sheets 186, and the like.

As illustrated in FIG. 9, the two sheets 186 may be formed into the same shape. A shape in plan view of each sheet 186 may be a rectangular shape. Outer rims 186*a* of the two sheets 186 may be bonded to each other. The bonding portion 187 where the two sheets 186 are bonded to each other may be located on all the four sizes of each sheet 186. The bonding portion 187 of this embodiment is located on the entire periphery of the outer rims 186*a* of the respective sheets 186 in such a way as to form a frame shape in plan view of the two sheets 186.

As illustrated in FIG. 10, an intra-sheet space S2 is defined between the two sheets 186 by sealing a gap between the two sheets 186 with the bonding portion 187. The polymer absorbers 188 may be located in the intra-sheet space S2. Before the polymer absorbers 188 absorb the liquid, the polymer absorbers 188 may be located away from one another in the intra-sheet space S2 or the intra-sheet space S2 may be filled with the polymer absorbers 188.

The two sheets 186 may be bonded such that its bonding force is reduced by adhesion of the liquid. The bonding portion 187 in this case bonds the two sheets 186 by attaching the two sheets 186 to each other by way of hydrogen bonding, for example. When the liquid adheres to the bonding portion 187 as a consequence of permeation of the liquid into the sheets 186, the bonding force attributed to the hydrogen bonding is reduced at the bonding portion 187 whereby the bonding force of the bonding portion 187 is reduced. When the bonding force between the two sheets 186 is reduced, the two sheets 186 are prone to deformation in such a way as to separate from each other. When the two sheets 186 are deformed in such a way as to separate from each other, the intra-sheet space S2 is wider than the state before the reduction in bonding force of the bonding portion 187.

When the polymer absorbers 188 swell as a consequence of absorption of the liquid, a pressure is applied from the polymer absorbers 188 to the two sheets 186. Receiving this pressure, the two sheets 186 are deformed in such a way as to be spread out. As a consequence, a force to separate the outer rims 186*a* of the two sheets 186 from each other acts on the bonding portion 187. The bonding force at the bonding portion 187 may be set such that the bonding of the sheets 186 is released when the force acts on the bonding portion 187 as described above. In other words, the two sheets 186 may be bonded to each other by using a bonding force that is weaker than the pressure received from the polymer absorbers 188 that swell as a consequence of the absorption of the liquid. In this case, the bonding portion 187 beaks up when the polymer absorbers 188 swell as a consequence of the absorption of the liquid. Accordingly, the bonding between the two sheets 186 by the bonding portion 187 is released at least partially at the outer rims 186*a* of the two sheets 186. Hence, the polymer absorbers 188 are displaceable from the inside of the intra-sheet space S2 to the outside of the absorber 185 through a gap between the outer rims 186*a* of the two sheets 186 where the bonding is released.

The bonding force at the bonding portion 187 may be set such that at least part of the bonding portion 187 beaks up when the polymer absorbers 188 absorb a predetermined volume of the liquid. The predetermined volume may be set preferably in a range from 0.5 $g/cm^3$ to 10.0 $g/cm^3$ inclusive, or more preferably in a range from 2.0 $g/cm^3$ to 8.0 $g/cm^3$ inclusive.

One of the two sheets 186 may be bonded to the transfer member 182. Of the two sheets 186, the sheet 186 located below is bonded to the transfer member 182 in this embodiment. For example, the sheet 186 is bonded to the transfer member 182 by using a double-sided tape, an adhesive agent, and the like. As a consequence of bonding the sheet 186 to the transfer member 182, the absorber 185 is located on the transfer member 182.

Various Numerical Value Ranges of Two Sheets

The areas of the two sheets 186 in plan view are not limited. For example, the area of each of the two sheets 186 in plan view may be at least equal to or above 5 $cm^2$ and equal to or below 900 $cm^2$. Preferably, the area of each of the two sheets 186 in plan view may be equal to or above 10 $cm^2$ and equal to or below 800 $cm^2$. In this way, it is possible to sufficiently secure the area of the bonding portion 187 and to provide a sufficient amount of the polymer absorbers 188 in the intra-sheet space S2.

An average length of the fibers constituting the two sheets 186 is not limited. For example, the average length of the fibers constituting the two sheets 186 may be equal to or above 0.1 mm and equal to or below 7 mm. The average length of the fibers constituting the two sheets 186 may preferably be equal to or above 0.1 mm and equal to or below 5 mm, or more preferably be equal to or above 0.1 mm and equal to or below 3 mm.

Although an average diameter of the fibers is not limited, the average diameter may be equal to or above 0.05 mm and equal to or below 2 mm. The average diameter of the fibers may preferably be equal to or above 0.1 mm and equal to or below 1 mm.

Although an average aspect ratio of the fibers is not limited, the average aspect ratio may be equal to or above 10 and equal to or below 1000. The average aspect ratio of the fibers may preferably be equal to or above 15 and equal to or below 500. The average aspect ratio of the fibers is a ratio of the average length of the fibers to the average diameter thereof.

Thicknesses of the two sheets 186 are not limited. The thicknesses of the two sheets 186 may be equal to each other or different from each other. The thickness of each of the two sheets 186 may be equal to or above 0.5 mm and equal to or below 5.0 mm. The thickness of each of the two sheets 186 may preferably be equal to or above 1.5 mm and equal to or below 3.0 mm.

Although a density of the fibers in the two sheets 186 is not limited, the density may be equal to or above 0.01 $g/cm^3$ and equal to or below 0.5 $g/cm^3$. The density of the fibers in the two sheets 186 may preferably be equal to or above 0.05 $g/cm^3$ and equal to or below 0.1 $g/cm^3$. As a consequence, the polymer absorbers 188 are less likely to leak out of the absorber 185 through the fibers in the two sheets 186.

The two sheets 186 set to the various numerical value ranges as described above can appropriately hold the polymer absorbers 188 in the intra-sheet space S2, hold the liquid by using the fibers, and feed the liquid to the polymer absorbers 188. In this way, it is possible to ameliorate the liquid absorption property of the absorber 185.

Configuration of Polymer Absorbers

The polymer absorbers 188 are formed from a resin that has a water absorption property and swells along with water absorption. The water absorption property mentioned herein corresponds to a function having the hydrophilic property and configured to hold moisture. The polymer absorbers 188 may be designed to be turned into gel along with water absorption.

The polymer absorbers 188 do not always have to be fixed to any of the two sheets 186. The polymer absorbers 188 may be located on an inner surface of one of the two sheets 186 which is located below. The polymer absorbers 188 may be located on the sheet 186 such that a weight of the polymer absorbers 188 per unit area of the lower sheet 186 falls within a predetermined weight range irrespective of the position on the sheet 186. The predetermined weight range may be a range from 100 $g/m^2$ to 500 $g/m^2$, for example. The predetermined weight range may preferably be a range from 150 $g/m^2$ to 300 $g/m^2$. A ratio of a total weight of the polymer absorbers 188 included in the absorber 185 to a total weight of the absorber 185 may be equal to or above 20% and equal to or below 95%.

The type of the resin constituting the polymer absorbers 188 is not limited. Examples of the resin constituting the polymer absorbers 188 include carboxymethyl cellulose, polyacrylic acid, polyacrylamide, starch-acrylic acid graft copolymers, starch-acrylonitrile graft copolymer hydrolysates, vinyl acetate-acrylic ester copolymers, isobutylene-maleic acid copolymers, hydrolysates of acrylonitrile copolymers or acrylamide copolymers, polyethylene oxide, polysulfonic acid compounds, polyglutamic acids, salts as neutralized products thereof, crosslinked products thereof, and so forth.

The polymer absorbers 188 are formed from a resin having a functional group in a side chain thereof. Examples of the functional group include an acid group, a hydroxyl group, an epoxy group, an amino group, and the like. When the polymer absorbers 188 are formed from a resin having an acid group in a side chain thereof, the polymer absorbers 188 may be formed from a resin having a carboxyl group in the side chain thereof.

Examples of a carboxyl group-containing unit constituting the side chain include units derived from monomers of acrylic acid, methacrylic acid, itaconic acid, maleic acid, crotonic acid, fumaric acid, sorbic acid, cinnamic acid, anhydrides thereof, salts thereof, and so forth.

When the polymer absorbers 188 at least partially include the polymer absorbers 188 having the acid groups in the side chains thereof, a formation percentage representing a percentage of formation of a salt by neutralization of the acid groups included in the polymer absorbers 188 may be equal to or above 30 mol % and equal to or below 100 mol %. The above-mentioned formation percentage may preferably be equal to or above 50 mol % and equal to or below 95 mol % or more preferably be equal to or above 60 mol % and equal to or below 90 mol %. The formation percentage may most preferably be equal to or above 70 mol % and equal to or below 80 mol %.

While the type of the salt to be formed to satisfy the above-mentioned formation percentage is not limited, the salt may be a sodium salt. In this case, it is possible to ameliorate the liquid absorption property of the polymer absorbers 188. Besides the sodium salt, examples of the salt adoptable as the salt to be formed to satisfy the above-mentioned formation percentage include a salt of a nitrogen-containing basic substance such as ammonia, a salt of an alkali metal, and the like. Examples of the salt of an alkali metal include the sodium salt, a potassium salt, a lithium salt, and the like.

In a case the polymer absorbers 188 have the acid groups in the side chains thereof, a rate of absorption of the liquid by the polymer absorbers 188 is accelerated as a consequence of development of electrostatic repulsion between the acid groups in the polymer absorbers 188 when the polymer absorbers 188 absorbs the liquid. This is why the polymer absorbers 188 preferably have the acid groups in the side chains thereof. When the acid groups in the polymer absorbers 188 are neutralized, the liquid is more likely to be absorbed by the polymer absorbers 188 due to an osmotic pressure.

The polymer absorbers 188 may include structural units which do not have acid groups in side chains thereof. Examples of the structural units in this case include hydrophilic structural units, hydrophobic structural units, structural units that serve as a polymerizable crosslinking agent, and the like.

Examples of the hydrophilic structural units include structural units derived from nonionic compounds such as acrylamide, methacrylamide, N-ethyl (meth)acrylamide, N-n-propyl (meth)acrylamide, N-isopropyl (meth)acrylamide, N,N-dimethyl (meth)acrylamide, 2-hydroxyethyl (meth) acrylate, 2-hydroxypropyl (meth)acrylate, methoxypolyethylene glycol (meth)acrylate, polyethylene glycol mono (meth)acrylate, N-vinylpyrrolidone, N-acryloylpiperidine, and N-acryloylpyrrolidine.

Examples of the hydrophobic structural units include structural units derived from compounds such as (meth) acrylonitrile, styrene, vinyl chloride, butadiene, isobutene, ethylene, propylene, stearyl (meth)acrylate, and lauryl (meth)acrylate.

Examples of the structural units that serve as a polymerizable crosslinking agent include structural units derived from diethyleneglycol diacrylate, N,N'-methylenebisacrylamide, polyethylene glycol diacrylate, polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol diacrylate, isocyanurate diacrylate, tetraallyloxyethane, and a salt of diallyloxyacetic acid.

The polymer absorbers 188 may contain any of a polyacrylic acid salt copolymer or a crosslinked polyacrylic acid polymer. Effects including improvement in liquid absorption property of the polymer absorbers 188, reduction in costs for manufacturing the polymer absorbers 188, and the like are expected in this case.

In the crosslinked polyacrylic acid polymer, a percentage of the carboxyl group-containing structural units out of the entire structural units that constitute molecular chains may be equal to or above 50 mol %, or preferably equal to or above 80 mol %, or most preferably equal to or above 90 mol %. When the polymer absorbers 188 contain the crosslinked polyacrylic acid polymer at the aforementioned percentage, it is possible to improve the liquid absorption property of the polymer absorbers 188.

The crosslinked polyacrylic acid polymer may be the one that forms a salt as a consequence of neutralization of part of the carboxyl groups. In the crosslinked polyacrylic acid polymer, a percentage of the carboxyl groups to be neutralized to form the salt out of the entire carboxyl groups may be equal to or above 30 mol % and equal to or below 99 mol %, or preferably equal to or above 50 mol % and equal to or below 99 mol %, or most preferably equal to or above 70 mol % and equal to or below 99 mol %.

The polymer absorbers 188 may have a structure crosslinked with a crosslinking agent other than the polymerizable crosslinking agent. When the polymer absorbers 188 are formed from the resin having the acid groups, a compound having a plurality of functional groups to react with the acid groups, for example, may be used as the crosslinking agent. When the resin having the functional group to react with the acid group forms the polymer absorbers 188, the compound having a plurality of functional groups to react with the acid groups in its molecule, for example, may be used as the crosslinking agent.

Examples of the compound having the plurality of functional groups to react with the acid groups include: a glycidyl ether compound such as ethylene glycol diglycidyl ether, trimethylolpropane triglycidyl ether, (poly)glycerol polyglycidyl ether, diglycerol polyglycidyl ether, and propylene glycol diglycidyl ether; polyhydric alcohols such as (poly)glycerol, (poly)ethylene glycol, propylene glycol, 1,3-propanediol, polyoxyethylene glycol, triethylene glycol, tetraethylene glycol, diethanolamine, and triethanolamine; polyamines such as ethylenediamine, diethylenediamine, polyethyleneimine, and hexamethylene diamine; and the like.

Multivalent ions such as zinc, calcium, magnesium, and aluminum may be used as the crosslinking agent. The crosslinking agent in this case also reacts with the acid groups included in the polymer absorbers 188. Regarding the granular polymer absorbers 188, an aspect ratio being a ratio of a maximum length to a minimum length of the polymer absorbers 188 is assumed to be equal to or above 0.3 and equal to or below 1.0. An average diameter of the polymer absorbers 188 in this case may be equal to or above 50 μm and equal to or below 800 μm, or preferably equal to or above 100 μm and equal to or below 600 μm, or most preferably equal to or above 200 μm and equal to or below 500 μm.

In addition to the polymer absorbers 188, the absorber 185 in the intra-sheet space S2 may further contain a component such as a surfactant, a lubricant, a defoamer, a filler, an anti-blocking agent, an ultraviolet absorber, a colorant such as a pigment and a dye, a flame retardant, and a flow improver.

A volume of the polymer absorbers 188 before absorbing the liquid, that is to say, a volume of the polymer absorbers 188 in a dried state will be referred to as a dried volume V1. A volume of the polymer absorbers 188 after absorbing the liquid to the maximum, that is to say, a volume of the polymer absorbers 188 in a swelling state will be referred to as a swelling volume V2. A value V2/V1 representing a ratio of the swelling volume V2 to the dried volume V1 may be equal to or above 2 and equal to or below 1000, or preferably equal to or above 5 and equal to or below 100. The polymer absorbers 188 in this case can absorb a sufficient amount of the liquid and apply a sufficient pressure for breaking the bonding portion 187 to the two sheets 186 when the liquid is absorbed.

Operations

Operations of this embodiment will be described together with an aspect of absorption of the liquid by the absorber 185.

Figure 11:
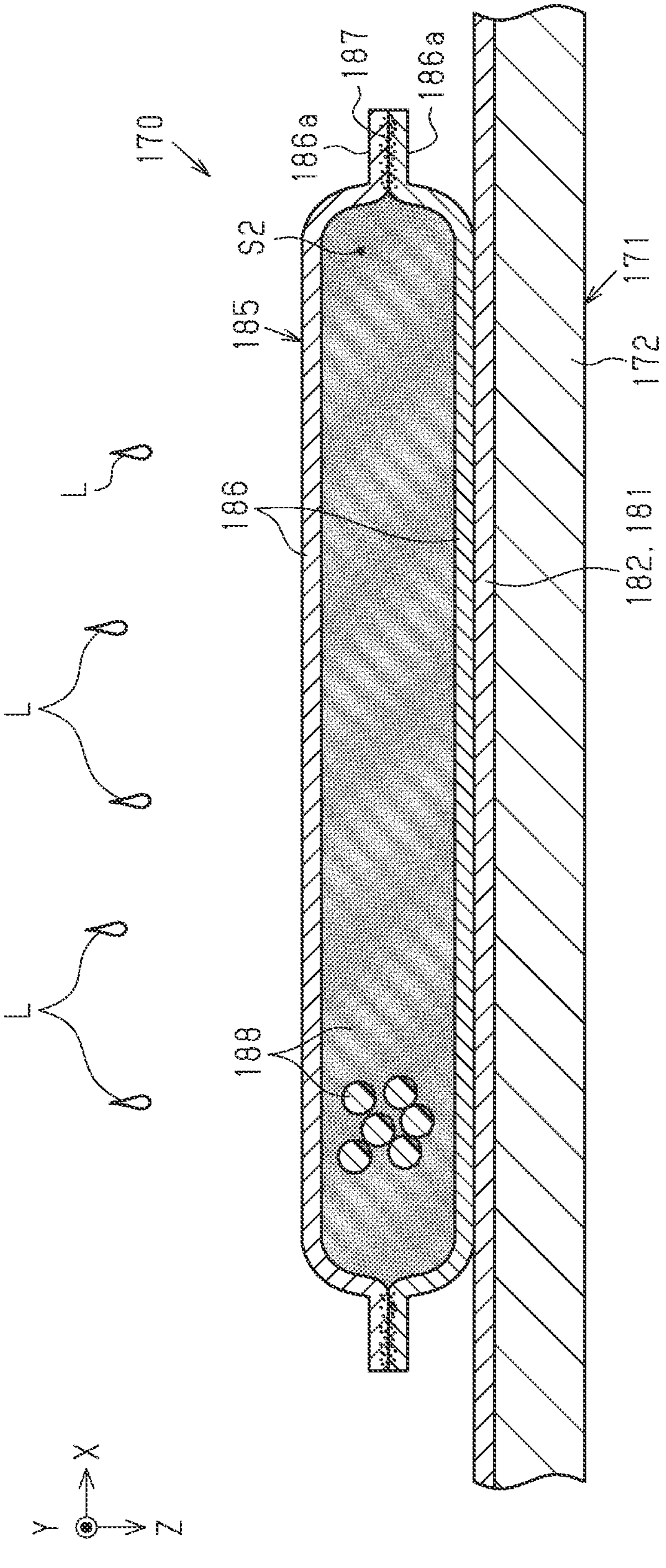
FIG. 11 is a cross-sectional view illustrating the liquid receiving tray when an absorber absorbs the liquid.

As illustrated in FIG. 11, the liquid falling on the liquid receiving tray 170 drops on the capillary force generating portion 181 or the absorber 185 located immediately below the liquid. Note that the liquid falling on the liquid receiving tray 170 is denoted by a code "L" and schematically illustrated in FIG. 11.

When the liquid falls on the capillary force generating portion 181, the capillary force generating portion 181 holds the liquid by using the transfer member 182. The liquid held by the transfer member 182 permeates the transfer member 182 and spreads inside the transfer member 182.

When the liquid drops on the absorber 185, the liquids permeates the upper sheet 186 out of the two sheets 186 in the absorber 185. In addition, the liquid may be transferred from the transfer member 182 to the absorber 185. In this case, the liquid is transferred from the capillary force generating portion 181 to the absorber 185. Accordingly, the liquid permeates from the transfer member 182 that holds the liquid to the lower sheet 186 out of the two sheets 186 of the absorber 185 located on this transfer member 182.

The plurality of absorbers 185 are located on the transfer member 182. Accordingly, when the liquid permeates the transfer member 182 and spreads into the transfer member 182, the liquid is transferred from the transfer member 182 to the sheets 186 of the absorbers 185 located on the transfer member 182. Thus, the liquid can efficiently permeate the absorbers 185.

In each absorber 185, the liquid that permeates the sheets 186 moves from the sheets 186 and permeates the polymer absorbers 188 located in the intra-sheet space S2. When the liquid permeates the polymer absorbers 188, the polymer absorbers 188 swell along with absorption of the liquid.

Regarding the absorber 185 before absorbing the liquid and the absorber 185 when the amount of absorption of the liquid is relatively small, the bonding portions 187 suppress the leakage of the polymer absorbers 188 out of the absorber 185. An example of the absorber 185 when the amount of absorption of the liquid is relatively small may be the absorber 185 to which the pressure from the polymer absorbers 188 does not act on the two sheets 186 due to the small amount of absorption of the liquid by the polymer absorbers 188. Another example of the absorber 185 when the amount of absorption of the liquid is relatively small may be the absorber 185 in which the liquid does not permeate to the outer rims 186*a* of the sheets 186 due to the small amount of absorption of the liquid by the sheets 186.

When the permeation of the liquid in the sheet 186 reaches the outer rims 186*a* of the sheets 186, the liquid adheres to the bonding portions 187 whereby the bonding force between the sheets 186 by using the bonding portions 187 is reduced. Accordingly, the two sheets 186 are apt to be deformed in such a way as to move away from each other. The intra-sheet space S2 expands when the two sheets 186 are deformed in such a way as to move away from each other, whereby the two sheets 186 are less likely to inhibit the polymer absorbers 188 from swelling. As a consequence, the absorption of the liquid by the polymer absorbers 188 is promoted.

The diameters of the polymer absorbers 188 are increased by the swelling of the polymer absorbers 188. Accordingly, the pressure is applied from the polymer absorbers 188 to the two sheets 186. The more the number of the swelling polymer absorbers 188 is, the larger the pressure is applied from the polymer absorbers 188 to the two sheets 186. The two sheets 186 that receive this pressure are deformed in a spreading fashion, whereby a force acts on the bonding portions 187 such that the outer rims 186*a* of the two sheets 186 move away from each other. As a consequence, the bonding between the two sheets 186 by using the bonding portions 187 is released.

Figure 12:
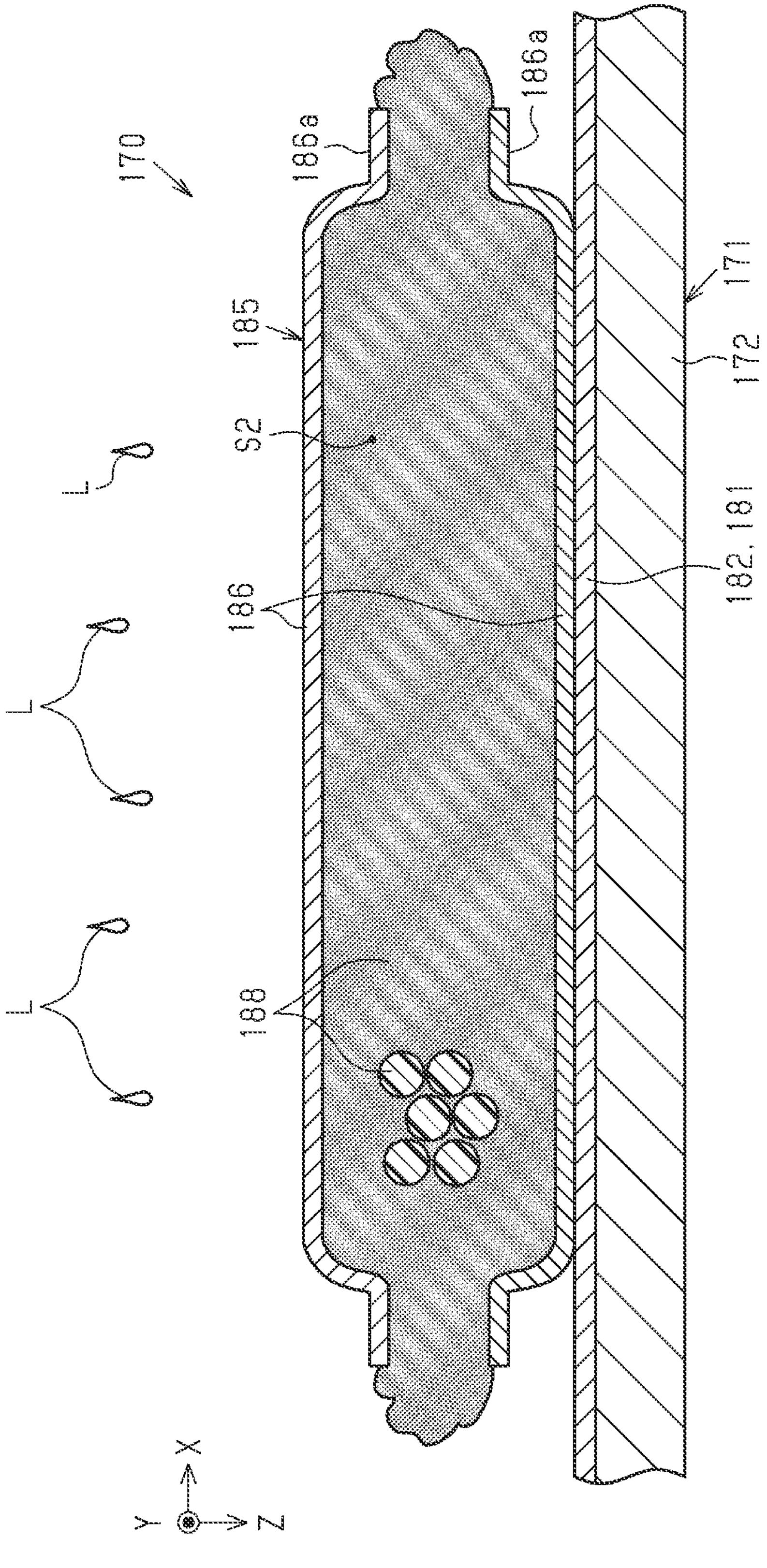
FIG. 12 is a cross-sectional view illustrating the liquid receiving tray when bonding between sheets is released.

When the bonding of the two sheets 186 by using the bonding portions 187 is released, the outer rims 186*a* of the two sheets 186 where the bonding is released are separated from each other as illustrated in FIG. 12. The polymer absorbers 188 leak out of the absorber 185 through a gap between the outer rims 186*a* of the two sheets 186 separated from each other.

As the bonding of the two sheets 186 is released, the swelling of the polymer absorbers 188 is hindered less by the two sheets 186. Accordingly, the polymer absorbers 188 can absorb a larger amount of the liquid as compared to the state before the release of the bonding of the two sheets 186.

Effects

A description will be given of effects of this embodiment.

(1) The liquid receiving tray 170 includes the capillary force generating portion 181 and at least one absorber 185. Accordingly, the liquid receiving tray 170 can move the liquid by using the capillary force generating portion 181 and hold the liquid at the same time. The at least one absorber 185 is disposed in such a way as to overlap the capillary force generating portion 181 and to come into contact with the capillary force generating portion 181. Accordingly, the liquid held by the capillary force generating portion 181 is transferred to the at least one absorber 185. In the absorber 185, the liquid is transferred to the polymer absorbers 188 through the sheets 186, and is thus absorbed by the polymer absorbers 188. As a consequence, the liquid is more likely to spread over the entire absorber 185 as compared to the liquid receiving tray 170 not provided with the capillary force generating portion 181. Thus, it is possible to improve liquid containing efficiency of the liquid receiving tray 170.

(2) The outer rims 186*a* of the two sheets 186 are bonded to each other. Accordingly, the polymer absorbers 188 before absorbing the liquid can be kept from dropping out of the liquid receiving tray 170 when there is an impact on the liquid receiving tray 170. Thus, it is possible to suppress a loss of the polymer absorbers 188 and to further improve the liquid containing efficiency of the liquid receiving tray 170.

(3) The two sheet 186 are bonded to each other such that the bonding force therebetween is reduced by adhesion of the liquid. When the liquid permeates the sheets 186, the bonding force between the two sheets 186 is reduced and the two sheets 186 are prone to deformation in such a way as to move away from each other. Accordingly, the two sheets 186 are less likely to inhibit the polymer absorbers 188 from swelling along with of the liquid absorption. Thus, it is possible to further improve the liquid containing efficiency of the liquid receiving tray 170.

(4) The two sheets 186 are bonded to each other with the bonding force which is weaker than the pressure received from the polymer absorbers 188 that swell along with the liquid absorption. When the polymer absorbers 188 swell along with the liquid absorption, the bonding between the two sheets 186 is released. Accordingly, the bonding portion 187 serving as a bonding point between the two sheets 186 is less likely to inhibit the polymer absorbers 188 from swelling along with the liquid absorption. Thus, it is possible to further improve the liquid containing efficiency of the liquid receiving tray 170.

(5) The transfer member 182 is bonded to the tray 171. One of the two sheets 186 is bonded to the transfer member 182. Accordingly, the absorber 185 before absorbing the liquid can be kept from being displaced when there is an impact on the liquid receiving tray 170. The absorber 185 can absorb the liquid while being kept from displacement. Thus, it is possible to further improve the liquid containing efficiency of the liquid receiving tray 170.

(6) The tray 171 includes the bottom wall 172 provided with the capillary force generating portion 181, and the side walls 173 extending from the bottom wall 172. The upper ends 173*a* of the side walls 173 are provided at the positions higher than the uppermost portion of the absorber 185 before absorbing the liquid. Accordingly, even when the absorber 185 after absorbing the liquid moves along with an impact on the liquid receiving tray 170, the absorber 185 can be kept from dropping out of the liquid receiving tray 170 since the movement of the absorber 185 is blocked by the side walls 173. Thus, it is possible to suppress a loss of the polymer absorbers 188 and to further improve the liquid containing efficiency of the liquid receiving tray 170.

(7) The upper ends 173*a* of the side walls 173 are provided at the positions higher than the swellable height of the absorber 185 when the absorber 185 absorbs the liquid. Accordingly, even when the absorber 185 after absorbing the liquid moves, the absorber 185 can be kept from dropping out of the liquid receiving tray 170 since the movement of the absorber 185 is blocked by the side walls 173. Thus, the absorber 185 after absorbing the liquid can be held in the liquid receiving tray 170.

(8) The liquid flowing portion 140 includes the joint portion 141 to which the flow channels 142 to flow the liquid are detachably coupled. The liquid receiving tray 170 is disposed below the joint portion 141. Accordingly, when the liquid drips from the joint portion 141, the liquid receiving tray 170 can receive the dripping liquid.

The above-described embodiment can be carried out by way of modifications as described below. The above-described embodiment and any of the following modified examples can be carried out in combination within a technically consistent range.

The position to dispose the liquid receiving tray 170 may be located at such a position that is displaced from positions below part or all of the draining portion 161, the coupling portion 163, and the liquid flowing portion 140 except the joint portion 141. The position to dispose the liquid receiving tray 170 may be located at such a position below the constituents of the liquid ejecting apparatus 111 other than the draining portion 161, the coupling portion 163, and the liquid flowing portion 140 except the joint portion 141. In short, the position to dispose the liquid receiving tray 170 in the liquid ejecting apparatus 111 only needs to include at least a position below the joint portion 141.

The component located inside of the liquid receiving tray 170 may be one of the attachment portion 143 and the waste liquid container 160. The components other than the attachment portion 143 and the waste liquid container 160 in liquid ejecting apparatus 111 may also be located in the liquid receiving tray 170. In these cases as well, the absorber 185 is restricted to swell upward when absorbing the liquid by the components located inside of the liquid receiving tray 170. Accordingly, the swellable height of the absorber 185 when the absorber 185 absorbs the liquid is determined by the positions to dispose the components in the liquid receiving tray 170.

The components of the liquid ejecting apparatus 111 do not have to be located inside of the liquid receiving tray 170. In this case, no components are located inside a portion of the tray 171 between the absorber 185 and the opening 171*a* of the tray 171. Accordingly, when the absorber 185 absorbs the liquid, the upward swelling of the absorber 185 is not restricted. The swellable height of the absorber 185 when the absorber 185 absorbs the liquid is equal to the height of the absorber 185 when the absorber 185 swells to the maximum.

The height to provide the upper end 173*a* of each side wall 173 may be as high as the swellable height of the absorber 185 when the absorber 185 absorbs the liquid, or lower than the swellable height of the absorber 185 when the absorber 185 absorbs the liquid.

The height to provide the upper end 173*a* of each side wall 173 may be as high as the uppermost portion of the absorber 185 before absorbing the liquid, or lower than the uppermost portion of the absorber 185 before absorbing the liquid.

The transfer members 182 may be bonded to the side walls 173. Of the transfer members 182 provided to the liquid receiving tray 170, part of the transfer members 182 may be bonded to the bottom wall 172 while the rest of the transfer members 182 may be bonded to the side walls 173. Of the transfer members 182 provided to the liquid receiving tray 170, part or all of the transfer members 182 may be bonded to the bottom wall 172 and to the side walls 173.

The transfer member 182 may be fixed to the tray 171 by means other than the bonding. The transfer member 182 does not always have to be fixed to the tray 171. In these cases as well, the capillary force generating portion 181 is provided to the bottom wall 172 by disposing the transfer member 182 on the bottom wall 172 so as to come into contact with the bottom wall 172.

The sheet or sheets 186 to be bonded to the transfer member 182 may be the two sheets 186 constituting the absorber 185 or the upper one of the sheets 186. In the latter case, the upper sheet 186 out of the two sheets 186 is made larger in size than the lower sheet 186, for example. Subsequently, a portion of the upper sheet 186 which does not overlap the lower sheet 186 is bonded to the transfer member 182. In this way, it is possible to bond the upper sheet 186 to the transfer member 182.

The sheet or sheets 186 may be fixed to the transfer member 182 by means other than the bonding. The sheet or sheets 186 may be fixed to the tray 171 by bonding and the like. In cases as well, the liquid can be transferred from the transfer member 182 to the absorber 185 as long as the absorber 185 overlaps the transfer member 182 in such a way as to come into contact with the transfer member 182.

The form of the tray 171 is not limited only to the form that includes the bottom wall 172 and the side walls 173 that extend from the bottom wall 172. For example, the tray 171 may take on a form that includes only the bottom wall 172 with no side walls 173. For example, the tray 171 may take on a form that does not distinguish between walls such as the bottom wall 172 and the side walls 173, and is curved as a whole in such a way as to be open upward.

At least one of the transfer member 182 and the sheets 186 may take on a shape other than the rectangular shape. Examples of the shape other than the rectangular shape include a polygonal shape other than the rectangular shape, a circular shape, and the like.

Shapes of at least some of the transfer members 182 located inside of the liquid receiving tray 170 may be different from each other. Shapes of the two sheets 186 may be different from each other among at least some of the absorbers 185 out of the absorbers 185 located inside of the liquid receiving tray 170.

The two sheet 186 do not always have to be formed into the same shape.

The entire periphery of the outer rim 186*a* of each of the sheets 186 does not have to be bonded. For example, the sheets 186 may be bonded to each other at a plurality of positions along the outer rim 186*a* of each of the sheets 186. Of the outer rims 186*a* of the two sheets 186, some portions may be bonded to one another without bonding the remaining portions.

The locations to bond the two sheets 186 to each other are not limited to the outer rims 186*a* of the two sheets 186. For example, the outer rim 186*a* of one of the two sheets 186 may be bonded to a portion other than the outer rim 186*a* of the other sheet 186, or portions other than the outer rims 186*a* of the two sheet 186 may be bonded to each other.

The method of bonding the two sheets 186 is not limited only to the hydrogen bonding. Examples of the method of bonding the two sheets 186 include fusion bonding such as thermal fusion bonding and ultrasonic fusion bonding, adhesive bonding using an adhesive agent, pressure bonding, and the like. The two sheets 186 may be bonded to each other by using two or more bonding methods mentioned above in combination. When at least one of the two sheets 186 contains the binder described in the embodiment, the two sheets 186 can be bonded to each other by thermal fusion bonding. A bonding strength between the two sheets 186 can be adjusted by appropriately controlling the grain size and the quantity of the binder contained in the two sheets 186. Examples of the adhesive agent include a water-soluble adhesive agent, an organic adhesive agent, and the like. Examples of the water-soluble adhesive agent include: proteins such as casein, soybean protein, and synthetic protein; various types of starch such as starch and oxidized starch; polyvinyl alcohols containing polyvinyl alcohol, cationic polyvinyl alcohol, modified polyvinyl alcohol such as silyl-modified polyvinyl alcohol, and the like; cellulose derivatives such as carboxymethyl cellulose and methyl cellulose; waterborne polyurethane resin; waterborne polyester resin; and the like. If the liquid is water-based, the water-soluble adhesive agent that comes into contact with the liquid dissolves in the liquid when the two sheets 186 are bonded to each other by using the water-soluble adhesive agent. Thus, it is possible to reduce the bonding strength between the two sheets 186 or to promote breakage of the bonded portions of the two sheets 186.

The two sheets 186 may be bonded to each other such that the bonding force is not reduced by adhesion of the liquid. Examples of the method of bonding the sheets 186 in this case include fusion bonding such as thermal fusion bonding and ultrasonic fusion bonding, adhesive bonding using an adhesive agent, pressure bonding, and the like.

The bonding force to bond the two sheets 186 to each other may be a bonding force that is larger than the pressure applied from the polymer absorbers 188 that swell as a consequence of absorbing the liquid to the two sheets 186.

The two sheets 186 may be fixed to each other by means other than the bonding. Examples of such a method other than the bonding include fixation using a fixing member such as a staple, and the like.

The two sheets 186 do not always have to be fixed to each other. In other words, the two sheets 186 only need to be designed to sandwich the polymer absorbers 188.

The polymer absorbers 188 may be fixed to at least one of the two sheets 186. When the polymer absorbers 188 are fixed to the sheet 186, it is possible suppress excessive displacement of the polymer absorbers 188 in the intra-sheet space S2. Hence, the polymer absorbers 188 are less likely to be unevenly distributed in the intra-sheet space S2, so that the polymer absorbers 188 can evenly absorb the liquid in the entire absorber 185. Examples of a method of fixing the polymer absorbers 188 to the sheet 186 include adhesive bonding using an adhesive agent, pressure-sensitive adhesion using agglutinating property of the polymer absorbers 188 which develops with addition of moisture to the polymer absorbers 188, and the like. The adhesive bonding using the adhesive agent may be carried out by using the adhesive agent discussed in the above-described modified example.

All the absorbers 185 may be disposed to extend across two or more transfer members 182. All the absorbers 185 may be disposed on one transfer member 182 instead of extending across two or more transfer members 182.

The single absorber 185 may be disposed in such a way as to overlap the transfer member 182. The liquid receiving tray 170 only needs to include at least one set of one transfer member 182 and one absorber 185 overlapping the transfer member 182. The absorber 185 in this case is disposed to overlap the capillary force generating portion 181 in such a way as to come into contact with the capillary force generating portion 181.

The absorber 185 may be disposed below the transfer member 182 in such a way as to come into contact with the transfer member 182. In this case, the absorber 185 is disposed on the bottom wall 172 of the tray 171, for example. The transfer member 182 is disposed on the absorber 185. Thus, the absorber 185 of this modified example is also disposed to overlap the capillary force generating portion 181 in such a way as to come into contact with the capillary force generating portion 181. In this modified example, the upper sheet 186 of the two sheets 186 may be bonded to the transfer member 182.

Figure 13:
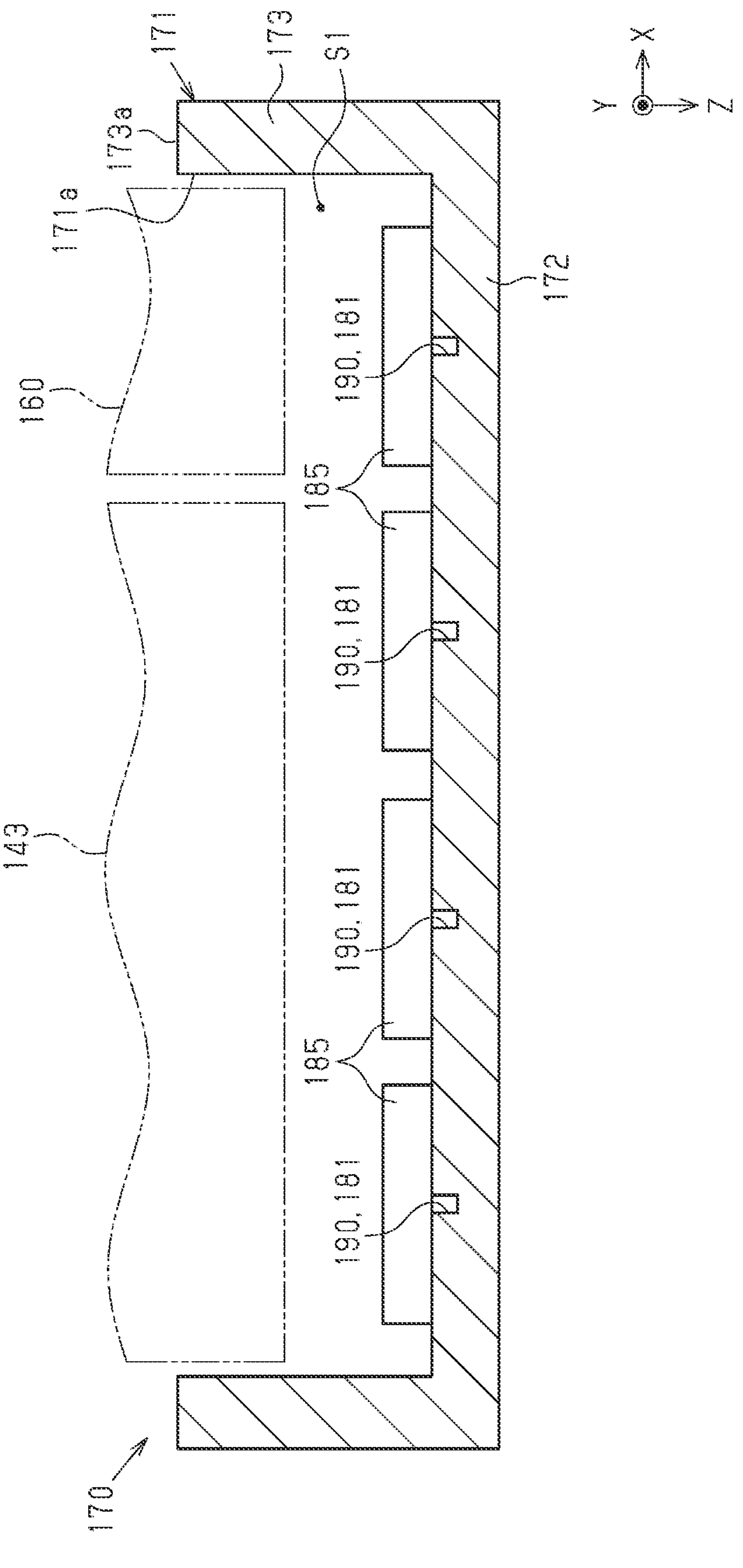
FIG. 13 is a cross-sectional view illustrating a liquid receiving tray of another embodiment.

As illustrated in FIG. 13, the capillary force generating portion 181 is not limited only to the aspect that includes the transfer member 182. In this case, the capillary force generating portion 181 may be a groove portion 190 formed in the tray 171, for example. The groove portion 190 may be formed in the bottom wall 172 of the tray 171. The groove portion 190 may extend linearly on the bottom wall 172 or may extend in a curved manner thereon. Of the bottom wall 172, the absorber 185 is disposed above the portion where the groove portion 190 is provided. In this way, the absorber 185 is disposed to overlap the capillary force generating portion 181 in such a way as to come into contact with the capillary force generating portion 181. The groove portion 190 can hold the liquid falling into the groove portion 190 and the liquid flowing on the bottom wall 172 to the groove portion 190. The liquid held in the groove portion 190 moves by using the capillary force and is thus transferred to the absorber 185 located above the groove portion 190. Accordingly, the capillary force generating portion 181 can hold the liquid and transfer the liquid from the capillary force generating portion 181 to the absorber 185. The capillary force generating portion 181 may be a rib projecting from the bottom wall 172.

The capillary force generating portion 181 may include two or more out of the transfer member 182, the groove portion 190, and the rib. In this case, the transfer member 182 is disposed at a portion of the bottom wall 172 of the tray 171 other than the portion provided with the groove portion 190, for example. The absorber 185 is disposed on the transfer member 182. The absorber 185 is disposed above the portion of the bottom wall 172 provided with the groove portion 190. In this way, the absorber 185 is disposed to overlap the capillary force generating portion 181 in such a way as to come into contact with the capillary force generating portion 181. The capillary force generating portion 181 can hold the liquid and transfer the liquid from the capillary force generating portion 181 to the absorber 185.

At least one capillary force generating portion 181 needs to be provided inside of the liquid receiving tray 170. At least one absorber 185 needs to be provided inside of the liquid receiving tray 170.

Each of the liquid ejecting apparatuses 11 and 111 may be a liquid ejecting apparatus configured to inject or eject a liquid other than the ink. Examples of the state of the liquid to be ejected from the liquid ejecting apparatus in the form of a very small amount of a liquid droplet include a granular shape, a teardrop shape, and a shape that is elongated into a threadlike shape. The liquid mentioned herein only needs to be a material that can be ejected from the liquid ejecting apparatus. For example, the liquid only needs to be a substance in a state of a liquid phase, and includes a liquid body substance having high or low viscosity, sol, gel water, and other liquid body substances such as inorganic solvents, organic solvents, solutions, liquid resin, liquid metal, and metallic melt. The liquid not only includes the liquid as a state of matter, but also includes grains of a functional material formed from a solid matter such as a pigment, metal grains, and the like to be dissolved, dispersed, of mixed in a solvent, for example. Typical examples of the liquid include a liquid crystal and the ink as discussed in the above-described embodiment. Here, the ink encompasses various liquid compositions including a general water-based ink, an oil-based ink, a gel ink, a hot melt ink, and the like. Specific examples of the liquid ejecting apparatus include apparatuses that eject liquids containing materials such as electrode materials and coloring materials in a dispersed or dissolved form used for manufacturing liquid crystal display devices, electroluminescence display devices, surface-emitting display devices, color filters, and the like. The liquid ejecting apparatuses may include an apparatus that ejects a bioorganic substance used for manufacturing biochips, an apparatus used as a precision pipette and configured to eject a liquid serving as a specimen, a textile printing apparatus, a microdispenser, and the like. The liquid ejecting apparatus may be an apparatus configured to perform pinpoint ejection of a lubricant oil on a precision instrument such as a watch and a camera, or an apparatus configured to eject a transparent resin liquid such as an ultraviolet curable resin for forming semispherical microlenses, optical lenses, and the like for use in optical communication devices and the like. The liquid ejecting apparatus may be an apparatus configured to eject an etching liquid such as an acidic or alkaline etchant for etching a substrate and the like.

What is claimed is:

1. A liquid ejecting apparatus comprising:

a liquid ejecting head configured to eject a liquid;

a liquid flowing portion coupled to the liquid ejecting head and configured to flow the liquid from a liquid container; and a frame configured to house the liquid ejecting head, the liquid container, and the liquid flowing portion, wherein the frame is provided with a passage hole configured to pass the liquid flowing portion along a depth direction and configured to be used to remove the liquid container, and when viewed in the depth direction, a portion of the liquid flowing portion disposed outside the passage hole is configured to be deformed.

2. The liquid ejecting apparatus according to claim 1, wherein when viewed in the depth direction, the liquid ejecting head is disposed outside of the passage hole, and the liquid flowing portion includes a coupling portion is configured to be attached to and detached from the liquid ejecting head, and a deformation flow channel configured to be deformed.

3. The liquid ejecting apparatus according to claim 2, wherein the frame includes:

a first surface provided with the passage hole; and a first access surface provided with a first access hole configured to access the coupling portion.

4. The liquid ejecting apparatus according to claim 3, wherein the liquid ejecting head is configured to pass through the first access hole.

5. The liquid ejecting apparatus according to claim 2, wherein the liquid flowing portion includes an attachment portion to which a liquid container containing the liquid is detachably attached, When viewed in the depth direction, the attachment portion is provided inside of the passage hole, and the attachment portion includes a holding portion configured to hold the deformation flow channel, and the holding portion is configured to hold the deformation flow channel when the liquid container is detached from the attachment portion.

6. The liquid ejecting apparatus according to claim 1, further comprising:

a maintenance portion configured to perform maintenance of the liquid ejecting head;

a waste liquid draining portion that drains the liquid discharged from the liquid ejecting head in the maintenance; and a waste liquid flow channel that communicates the maintenance portion and the waste liquid draining portion, wherein the waste liquid flow channel includes a dividing portion configured to divide the waste liquid flow channel, and a downstream flow channel that communicates the dividing portion and the waste liquid draining portion, and When viewed in the depth direction, the downstream flow channel is provided inside of the passage hole.

7. The liquid ejecting apparatus according to claim 6, wherein the waste liquid flow channel includes an upstream flow channel that communicates the maintenance portion and the dividing portion, and the downstream flow channel is provided between the upstream flow channel and the passage hole.

8. The liquid ejecting apparatus according to claim 6, wherein the frame includes a second access surface provided with a second access hole configured to access the dividing portion.

9. The liquid ejecting apparatus according to claim 5, further comprising:

a tray provided inside of the passage hole when viewed in the depth direction, wherein the attachment portion is provided inside of the tray in a horizontal direction.

10. The liquid ejecting apparatus according to claim 6, further comprising:

a tray provided inside of the passage hole when viewed in the depth direction, wherein the liquid flowing portion includes an attachment portion to which a liquid container containing the liquid is detachably attached, and the attachment portion, the dividing portion, and the waste liquid draining portion is provided inside of the tray in a horizontal direction.

11. A liquid ejecting apparatus comprising:

a liquid ejecting head configured to eject a liquid;

a liquid flowing portion coupled to the liquid ejecting head and configured to flow the liquid; and a frame that houses the liquid ejecting head and the liquid flowing portion, wherein the frame is provided with a passage hole configured to pass the liquid flowing portion along a depth direction, when viewed in the depth direction, a portion of the liquid flowing portion disposed outside the passage hole is configured to be deformed, when viewed in the depth direction, the liquid ejecting head is disposed outside of the passage hole, and the liquid flowing portion includes:

a coupling portion is configured to be attached to and detached from the liquid ejecting head, and a deformation flow channel configured to be deformed, and the frame includes:

a first surface provided with the passage hole; and a first access surface provided with a first access hole configured to access the coupling portion.

12. A liquid ejecting apparatus comprising:

a liquid ejecting head configured to eject a liquid;

a liquid flowing portion coupled to the liquid ejecting head and configured to flow the liquid;

a frame that houses the liquid ejecting head and the liquid flowing portion;

a maintenance portion configured to perform maintenance of the liquid ejecting head;

a waste liquid draining portion that drains the liquid discharged from the liquid ejecting head in the maintenance; and a waste liquid flow channel that communicates the maintenance portion and the waste liquid draining portion, wherein the frame is provided with a passage hole configured to pass the liquid flowing portion along a depth direction, when viewed in the depth direction, a portion of the liquid flowing portion disposed outside the passage hole is configured to be deformed, the waste liquid flow channel includes:

a dividing portion configured to divide the waste liquid flow channel; and a downstream flow channel that communicates the dividing portion and the waste liquid draining portion, and when viewed in the depth direction, the downstream flow channel is provided inside of the passage hole.

* * * * *